US012260699B2

(12) United States Patent
Ueyama et al.

(10) Patent No.: US 12,260,699 B2
(45) Date of Patent: Mar. 25, 2025

(54) OPTICAL SENSOR, PAPER SHEET IDENTIFICATION DEVICE, AND PAPER SHEET PROCESSING DEVICE

(71) Applicant: Glory Ltd., Himeji (JP)

(72) Inventors: Naoki Ueyama, Hyogo (JP); Daiki Takehara, Hyogo (JP)

(73) Assignee: GLORY LTD., Himeji (JP)

( * ) Notice: Subject to any disclaimer, the term of this patent is extended or adjusted under 35 U.S.C. 154(b) by 330 days.

(21) Appl. No.: 17/890,287

(22) Filed: Aug. 18, 2022

(65) Prior Publication Data

US 2022/0392289 A1 Dec. 8, 2022

Related U.S. Application Data

(63) Continuation of application No. PCT/JP2021/006122, filed on Feb. 18, 2021.

(30) Foreign Application Priority Data

Feb. 18, 2020 (JP) .................................. 2020-025346

(51) Int. Cl.
G01N 21/64 (2006.01)
G01N 21/86 (2006.01)
G07D 7/121 (2016.01)

(52) U.S. Cl.
CPC ............ *G07D 7/121* (2013.01); *G01N 21/64* (2013.01); *G01N 21/86* (2013.01); *G01N 2021/6491* (2013.01); *G07D 2207/00* (2013.01)

(58) Field of Classification Search
CPC .. G07D 7/121; G07D 2207/00; G07D 7/1205; G01N 21/64; G01N 21/86; G01N 2021/6491
See application file for complete search history.

(56) References Cited

U.S. PATENT DOCUMENTS

2008/0316346 A1  12/2008  Watanabe
2013/0142414 A1   6/2013  Ikari et al.
(Continued)

FOREIGN PATENT DOCUMENTS

JP    2009-5111 A    1/2009
JP    2016-53783 A   4/2016
(Continued)

OTHER PUBLICATIONS

International Search Report and Written Opinion mailed on Apr. 13, 2021, received for PCT Application PCT/JP2021/006122, filed on Feb. 18, 2021, 8 pages including English Translation.

*Primary Examiner* — Courtney D Thomas
(74) *Attorney, Agent, or Firm* — XSENSUS LLP

(57) ABSTRACT

An optical sensor of the present disclosure detects light reflected by a transported sheet and/or light transmitted through the sheet as well as light emitted from the sheet. The optical sensor includes: a light source configured to irradiate a sheet with excitation light and detection light; a controller configured to keep the light source turned off during each of light-off periods after the emission of the excitation light; and a light receiver configured to receive light resulting from reflection of the detection light by a sheet and/or light resulting from transmission of the detection light through the sheet in each of the light-on periods and receive phosphorescence emitted from the sheet in each of the light-off periods. The controller is configured to generate data of one pixel by summing up output values based on respective phosphorescence components received by the light receiver in each of the light-off periods.

21 Claims, 21 Drawing Sheets

(56) References Cited

U.S. PATENT DOCUMENTS

2016/0155028 A1    6/2016    Zhang et al.
2016/0171810 A1    6/2016    Dossey
2017/0276543 A1*  9/2017    Bogaki .................. H04N 1/488

FOREIGN PATENT DOCUMENTS

JP          6316148 A    4/2018
WO    2010/018353 A1    2/2010

\* cited by examiner

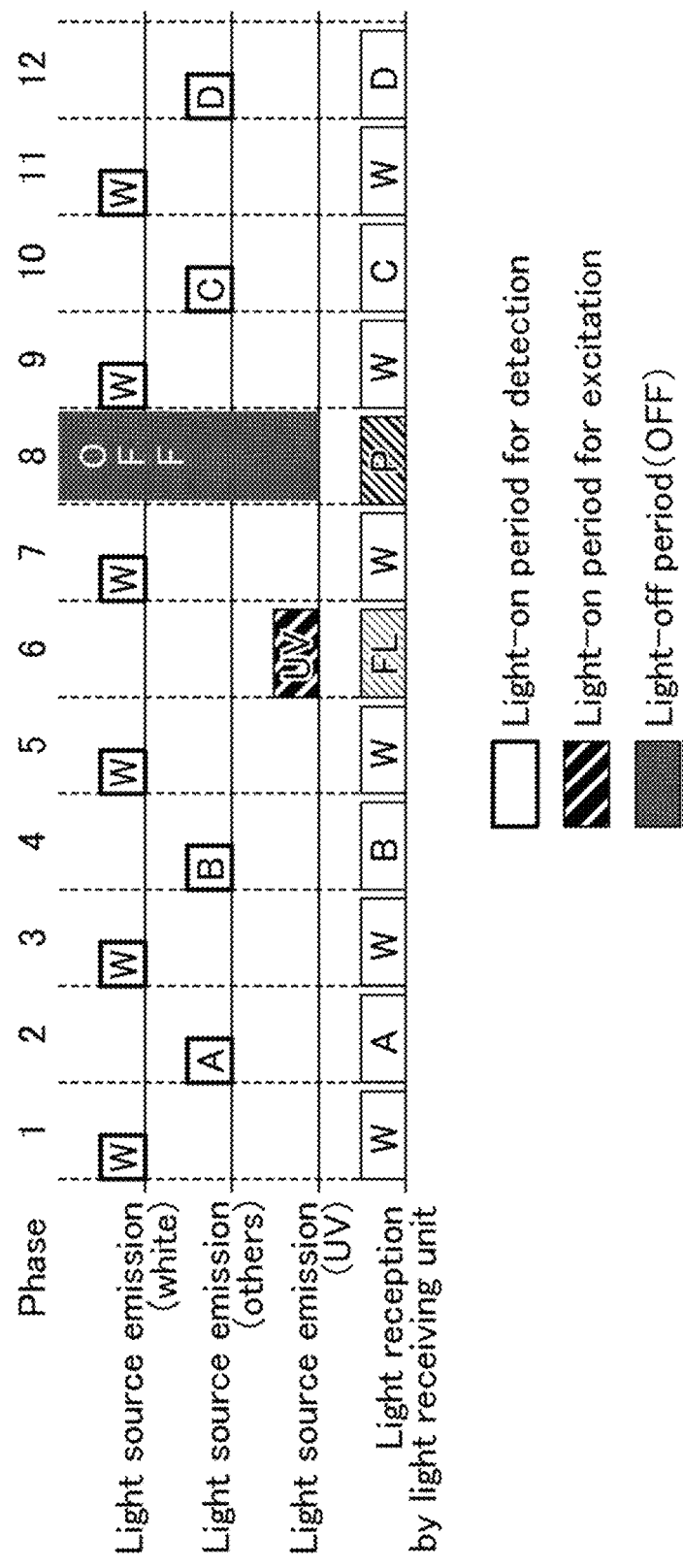

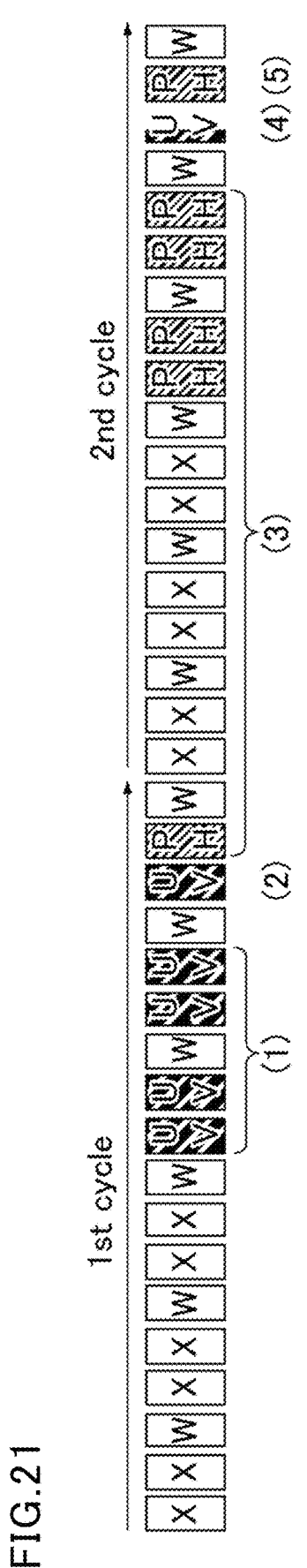

OPTICAL SENSOR, PAPER SHEET IDENTIFICATION DEVICE, AND PAPER SHEET PROCESSING DEVICE

CROSS-REFERENCE TO RELATED APPLICATIONS

The present application is a Continuation Application of PCT Application No. PCT/JP2021/006122 filed on Feb. 18, 2021 and claims priority to Japanese Patent Application No. 2020-025346 filed on Feb. 18, 2020 under the Paris Convention and provisions of national law in a designated State. The entire contents of each application are hereby incorporated by reference.

TECHNICAL FIELD

The present disclosure relates to optical sensors, sheet recognition units, and sheet handling devices. The present disclosure more specifically relates to an optical sensor, a sheet recognition unit, and a sheet handling device that are suitably applicable to cases where the amount of light received by the light receiving units in the optical sensor is small.

BACKGROUND

Sheet handling devices that execute processings such as a banknote depositing and dispensing processing includes a sheet recognition unit used to recognize the characteristics of sheets such as their types, fitness, and authenticity during transportation of the sheets. The sheet recognition unit includes, for example, an optical sensor that irradiates a banknote with lights having different wavelength bands and generates reflection images and/or transmission images for the different wavelength bands based on the amount of reflection light reflected by the banknote and/or the amount of transmission light transmitted through the banknote. The sheet recognition unit executes a recognition processing and other processings based on these images. Herein, light applied to a transported sheet for detection of reflection light and/or transmission light from the sheet is also referred to as detection light.

Recent years have witnessed the development of an optical sensor that detects phosphorescence from phosphorescent ink printed on a banknote as a security element for anti-counterfeiting. More specifically, optical sensors, for example, are known which irradiate a transported sheet with excitation light and then turn off the excitation light to detect phosphorescence emitted from the sheet. Phosphorescence is usually difficult to detect as it is emitted at a low intensity although having a long lifetime (emission time).

Examples of a device used to detect such phosphorescence include the excitation light detection device disclosed in JP 6316148 B. The excitation light detection device of JP 6316148 B can detect phosphorescence emitted at a low intensity by using its detection unit to detect fluorescence emitted from a sheet while supplying a current to its light source to irradiate the sheet with light, irradiating the sheet with light with an increased amount current supplied to the light source or an increased time for the supply, terminating the irradiation with light from the light source, and then using the detection unit to detect phosphorescence emitted from the sheet.

SUMMARY

An optical sensor according to one aspect of the present disclosure detects light reflected by a transported sheet and/or light transmitted through the sheet as well as light emitted from the sheet, the optical sensor including: a light source configured to irradiate a sheet with excitation light and detection light; a controller configured to cause the light source to emit the detection light in a plurality of light-on periods and the excitation light at least one time, and keep the light source turned off during each of a plurality of light-off periods after the emission of the excitation light; and a light receiver configured to receive light resulting from reflection of the detection light by a sheet and/or light resulting from transmission of the detection light through the sheet in each of the plurality of light-on periods and receive phosphorescence emitted from the sheet in each of the plurality of light-off periods; the controller configured to generate data of one pixel by summing up a plurality of output values based on a plurality of respective phosphorescence components received by the light receiver in each of the plurality of light-off periods.

An optical sensor according to a second aspect of the present disclosure detects light reflected by a transported sheet and/or light transmitted through the sheet as well as light emitted from the sheet, the optical sensor including: a light source configured to irradiate a sheet with excitation light and detection light; a controller configured to cause the light source to emit the detection light in a plurality of light-on periods and the excitation light in a plurality of periods each sandwiched between two consecutive light-on periods of the detection light, and keep the light source turned off in a light-off period after the emission of the excitation light; and a light receiver configured to receive light resulting from reflection of the detection light by a sheet and/or light resulting from transmission of the detection light through the sheet in each of the light-on periods and receive phosphorescence emitted from the sheet in the light-off period.

An optical sensor according to a third aspect of the present disclosure detects light from a transported sheet, the optical sensor including: a light source configured to irradiate a sheet with at least one type of light; a controller configured to cause the light source to emit the at least one type of light in a plurality of light-on periods; and a light receiver configured to receive light from the sheet resulting from a same type of light applied to a same side of the sheet in each of a plurality of periods, the controller configured to generate data of one pixel by summing up a plurality of output values based on a plurality of respective light components received by the light receiver in each of the plurality of periods.

BRIEF DESCRIPTION OF DRAWINGS

FIG. 20 is a timing chart showing the timing of turning on of a light source and the timing of light reception by a light receiving unit in an optical sensor of Comparative Embodiment 1.

FIG. 21 is a timing chart showing sensor control (turning on of light sources) for fluorescence and phosphorescence detection in a banknote handling device (imaging unit) of Embodiment 8 and a series of signal detection timings.

DETAILED DESCRIPTION

Figure 1:
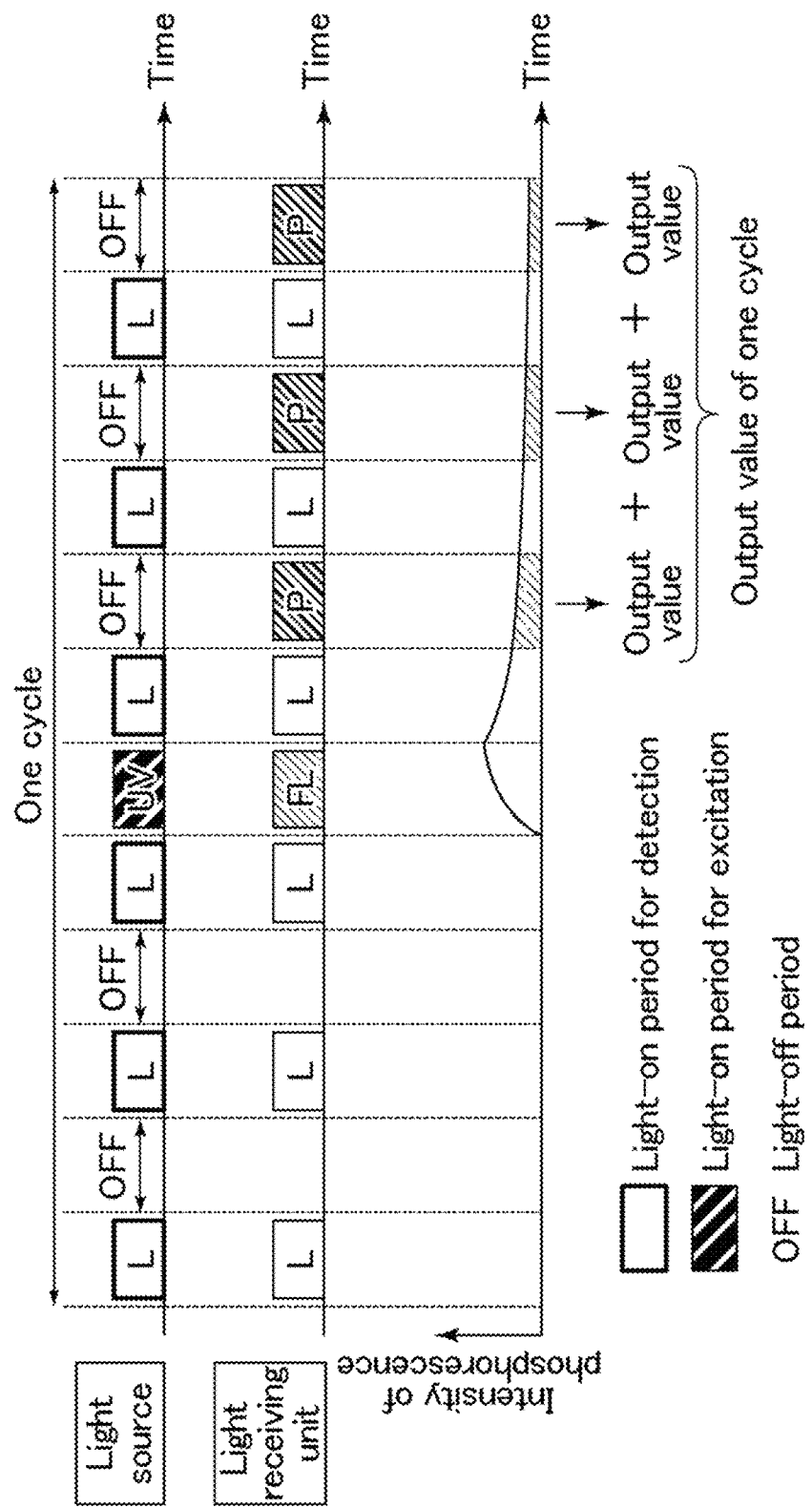
FIG. 1 is a view used to describe the outline of an optical sensor of Embodiment 1.

An optical sensor of Comparative Embodiment 1 on which the present inventors made studies is described with reference to FIG. 20. The optical sensor of Comparative Embodiment 1 has a function of detecting fluorescence (FL) and phosphorescence (P) added to a conventional optical sensor which detects reflection light and/or transmission light from a transported sheet to acquire images of the sheet. The optical sensor of Comparative Embodiment 1 includes light sources that irradiate a transported sheet with light and a light receiving unit that receives light from the sheet. The light sources include a reflection light source disposed on the same side as the light receiving unit relative to a transported sheet, and a transmission light source disposed opposite to the light receiving unit with the transported sheet in between.

The optical sensor of Comparative Embodiment 1 turns on the light sources and receives light using the light receiving unit in 12 phases shown in FIG. 20 which are taken as one cycle. The optical sensor repeats this cycle to acquire data corresponding to the entire surface of a sheet. In FIG. 20, W indicates white light emitted from the reflection light source; A to D each indicate first infrared light (IR1) emitted from the reflection light source, second infrared light (IR2) emitted from the reflection light source, first infrared light (TIR1) emitted from the transmission light source, or green light (TG) emitted from the transmission light source; and UV indicates ultraviolet light emitted from the reflection light source.

In order to add the function of detecting fluorescence and phosphorescence to a conventional optical sensor, the optical sensor of Comparative Embodiment 1 applies ultraviolet light in phase 6 (several tens of microseconds) of the 12 phases constituting one cycle to detect fluorescence and turns off light in phase 8 (several tens of microseconds) to detect phosphorescence, as shown in FIG. 20. However, both the time for application of ultraviolet light and the time for reception of phosphorescence are short, which may result in an unpractical S/N of output signals of phosphorescence (hereinafter, also referred to as phosphorescence signals).

The excitation light detection device of JP 6316148 B detects phosphorescence emitted from a transported sheet although it lacks the function of conventional optical sensors of detecting detection light to acquire reflection images and transmission images. The excitation light detection device of JP 6316148 B increases the application time of excitation light to increase the phosphorescence signal value. This, however, increases the time required for one cycle. Also, the excitation light detection device of JP 6316148 B increases the amount of current flowing to the light source in application of excitation light to increase the phosphorescence signal value. This increases the amount of heat released from the light source, and thus may require a new mechanism to release the increased heat, possibly leading to an increase in cost. The phosphorescence signal value may also be increased by increasing the size of the light source, but this may also increase the amount of heat released from the light source, possibly leading to an increase in cost. The excitation light detection device of JP 6316148 B therefore can increase the phosphorescence signal value, but may be accompanied with an increase in time required for one cycle or issues related to the light source.

In response to the above current state of the art, an object of the present disclosure is to provide an optical sensor which can increase the S/N of output signals while reducing or preventing an increase in time required for one cycle and issues related to a light source; a sheet recognition unit; and a sheet handling device.

In order to solve the above issue and to achieve the object, (1) an optical sensor of a first aspect of the present disclosure detects light reflected by a transported sheet and/or light transmitted through the sheet as well as light emitted from the sheet, the optical sensor including: a light source configured to irradiate a sheet with excitation light and detection light; a controller configured to cause the light source to emit the detection light in a plurality of light-on periods and the excitation light at least one time, and keep the light source turned off during each of a plurality of light-off periods after the emission of the excitation light; and a light receiver configured to receive light resulting from reflection of the detection light by a sheet and/or light resulting from transmission of the detection light through the sheet in each of the plurality of light-on periods and receive phosphorescence emitted from the sheet in each of the plurality of light-off periods, the controller configured to generate data of one pixel by summing up a plurality of output values based on a plurality of respective phosphorescence components received by the light receiver in each of the plurality of light-off periods.

(2) In the optical sensor according to (1) above, the controller may be configured to, in one cycle, cause the light source to emit the detection light in the plurality of light-on periods and the excitation light at least one time, and keep the light source turned off during each of the plurality of light-off periods after the emission of the excitation light; the light receiver is configured to, in one cycle, receive the detection light reflected by a sheet and/or the detection light transmitted through the sheet in each of the plurality of light-on periods and receive phosphorescence emitted from the sheet in each of the plurality of light-off periods; and the controller is configured to generate data of one pixel by summing up a plurality of output values based on a plurality of respective phosphorescence components received by the light receiver in each of the plurality of light-off periods in one cycle.

(3) In the optical sensor according to (1) or (2) above, the controller may be configured to cause the light source to emit the excitation light in a plurality of periods each sandwiched between two consecutive light-on periods of the detection light.

(4) In the optical sensor according to (3) above, the controller may be configured to, in one cycle, cause the light source to emit the excitation light in the plurality of periods.

(5) In the optical sensor according to (3) above, the controller may be configured to cause the light source to emit the excitation light at a first dose in a first period among the plurality of periods and emit the excitation light at a second dose lower than the first dose in a second period scheduled for after the first period among the plurality of periods, and the light receiver may be configured to receive fluorescence from the sheet while the light source emits the excitation light in the first period and receive fluorescence from the sheet while the light source emits the excitation light in the second period.

(6) In the optical sensor according to any one of (1) to (5) above, the light receiver may be configured to receive fluorescence emitted from the sheet while the light source emits the excitation light.

(7) In the optical sensor according to (6) above, the controller may be configured to cause the light source to emit the excitation light at least one time before the light receiver receives fluorescence emitted from the sheet.

(8) In the optical sensor according to (7) above, the light receiver may be configured to receive phosphorescence emitted from the sheet in at least one of the plurality of light-off periods before receiving fluorescence emitted from the sheet.

(9) In the optical sensor according to any one of (3) to (7) above, the controller may be configured to keep the light source turned off during each of the plurality of light-off periods after the emission of the excitation light in the plurality of periods, and the light receiver may be configured to receive fluorescence emitted from the sheet in any of second and subsequent periods of the plurality of periods in which the light source emits the excitation light and receive phosphorescence emitted after a lapse of the plurality of periods from the sheet in the plurality of light-off periods.

(10) In the optical sensor according to any one of (6) to (9) above, the light receiver may include a light receiving element, a capacitor configured to store electric charge from the light receiving element, and a hold switch configured to switch electrical connection between the light receiving element and the capacitor, the light receiver may be controlled to sequentially include, in one cycle, a first storage period of storing electric charge from the light receiving element in the capacitor, a transfer period of transferring electric charge stored in the capacitor, a discharge period of discharging the capacitor, and a second storage period of storing electric charge from the light receiving element, and the light source may irradiate a sheet with the excitation light during the transfer period and/or the discharge period, and the hold switch may be in an off state during the transfer period so that the electrical connection between the light receiving element and the capacitor is terminated.

(11) In the optical sensor according to any one of (1) to (10) above, the light receiver may include a plurality of pixels arranged in a line in a main scanning direction.

(12) In the optical sensor according to (11) above, the controller may sum up a plurality of output values outputted by a same pixel and related to respective phosphorescence components belonging to a same cycle.

(13) An optical sensor according to a second aspect of the present disclosure detects light reflected by a transported sheet and/or light transmitted through the sheet as well as light emitted from the sheet, the optical sensor including: a light source configured to irradiate a sheet with excitation light and detection light; a controller configured to cause the light source to emit the detection light in a plurality of light-on periods and the excitation light in a plurality of periods each sandwiched between two consecutive light-on periods of the detection light, and keep the light source turned off in a light-off period after the emission of the excitation light; and a light receiver configured to receive light resulting from reflection of the detection light by a sheet and/or light resulting from transmission of the detection light through the sheet in each of the light-on periods and receive phosphorescence emitted from the sheet in the light-off period.

(14) In the optical sensor according to (13) above, the controller may be configured to, in one cycle, cause the light source to emit the detection light in the plurality of light-on periods and the excitation light in the plurality of periods each sandwiched between the two consecutive light-on periods of the detection light, and keep the light source turned off during the light-off period after the emission of the excitation light, and the light receiver may be configured to, in one cycle, receive light resulting from reflection of the detection light by the sheet and/or light resulting from transmission of the detection light through the sheet in each of the plurality of light-on periods and receive phosphorescence emitted from the sheet in the light-off period.

(15) In the optical sensor according to (13) or (14) above, the light receiver may be configured to receive fluorescence emitted from the sheet while the light source emits the excitation light.

(16) In the optical sensor according to (15) above, the controller may be configured to cause the light source to emit the excitation light at least one time before the light receiver receives fluorescence emitted from the sheet.

(17) In the optical sensor according to any one of (13) to (16) above, the controller is configured to cause the light source to emit the excitation light at a first dose in a first period among the plurality of periods and emit the excitation light at a second dose lower than the first dose in a second period scheduled for after the first period among the plurality of periods, and the light receiver is configured to receive fluorescence from the sheet while the light source emits the excitation light in the first period and receive fluorescence from the sheet while the light source emits the excitation light in the second period.

(18) In the optical sensor according to any one of (13) to (17) above, the controller may be configured to keep the light source turned off after the emission of the excitation light in the plurality of periods, and the light receiver may be configured to receive fluorescence emitted from the sheet in any of the second and subsequent periods of the plurality of periods in which the light source emits the excitation light and receive phosphorescence emitted after a lapse of the plurality of periods from the sheet in the light-off period.

(19) In the optical sensor according to any one of (15) to (18) above, the light receiver may include a light receiving element, a capacitor configured to store electric charge from the light receiving element, and a hold switch configured to switch electrical connection between the light receiving element and the capacitor, the light receiver may be controlled to sequentially include, in one cycle, a first storage period of storing electric charge from the light receiving element in the capacitor, a transfer period of transferring electric charge stored in the capacitor, a discharge period of discharging the capacitor, and a second storage period of storing electric charge from the light receiving element, and the light source may irradiate a sheet with the excitation light during the transfer period and/or the discharge period, and the hold switch may be in an off state during the transfer period so that the electrical connection between the light receiving element and the capacitor is terminated.

(20) An optical sensor according to a third aspect of the present disclosure detects light from a transported sheet, the optical sensor including: a light source configured to irradiate a sheet with at least one type of light; a controller configured to cause the light source to emit the at least one type of light in a plurality of light-on periods; and a light receiver configured to receive light from the sheet resulting from a same type of light applied to a same side of the sheet in each of a plurality of periods, the controller configured to generate data of one pixel by summing up a plurality of output values based on a plurality of respective light components received by the light receiver in each of the plurality of periods.

(21) In the optical sensor according to (20) above, the controller may be configured to, in one cycle, cause the light source to emit the at least one type of light in the plurality of light-on periods; the light receiver may be configured to receive light from the sheet resulting from the same type of light applied to the same side of the sheet in each of the plurality of periods in one cycle; and the controller may be configured to generate data of one pixel by summing up a plurality of output values based on a plurality of respective light components received by the light receiver in each of the plurality of periods.

(22) In the optical sensor according to (20) or (21) above, the light receiver may include a plurality of pixels arranged in a line in a main scanning direction.

(23) In the optical sensor according to (22) above, the controller may sum up a plurality of output values outputted by a same pixel and related to respective light components belonging to a same cycle.

(24) In the optical sensor according to any one of (20) to (23) above, the same type of light applied to the same side of the sheet may be light having a same wavelength band applied to one main surface side of the sheet.

(25) In the optical sensor according to any one of (20) to (24) above, the light from the sheet resulting from the same type of light may be light resulting from reflection by the sheet of light having a certain wavelength band applied to one main surface side of the sheet.

(26) In the optical sensor according to any one of (20) to (24) above, the light from the sheet resulting from the same type of light may be light resulting from transmission through the sheet of light having a certain wavelength band applied to one main surface side of the sheet.

(27) A sheet recognition unit according to a fourth aspect of the present disclosure includes the optical sensor according to any one of (1) to (26) above.

(28) A sheet handling device according to a fifth aspect of the present disclosure includes the sheet recognition unit according to (27) above.

The present disclosure can increase the S/N of output signals while preventing or reducing an increase in time required for one cycle and defects related to a light source.

Preferred embodiments of the optical sensor, the sheet recognition unit, and the sheet handling device of the present invention are described with reference to the drawings. Various sheets such as banknotes, checks, vouchers, bills, business forms, documents of value, and card-like media are applicable as sheets used in the present invention. Devices for banknotes are used hereinbelow as examples to describe the present invention. Also, the following describes the cases where the optical sensor of the present invention has the function of an optical line sensor in which pixels each including a plurality of light receiving elements are arranged in the main scanning direction. The same components or components having similar functions in the following description are commonly assigned with the same reference sign throughout the drawings as appropriate, and description thereof is omitted as appropriate. Drawings showing a structure appropriately include the XYZ coordinates orthogonal to one another.

The term "reflection image" herein means an image based on the intensity distribution of light that has been applied to an object and reflected by the object. The term "transmission image" herein means an image based on the intensity distribution of light that has been applied to an object and transmitted through the object.

Embodiment 1

Summary of the Present Embodiment

First, the present embodiment is summarized with reference to FIG. 1. An optical sensor of the present embodiment is different from the optical sensor of Comparative Embodiment 1, which irradiates a transported banknote with excitation light to detect fluorescence (FL) and phosphorescence (P) while acquiring a reflection image and/or a transmission image of the banknote, mainly in the following points: the optical sensor in each cycle (1) detects phosphorescence a plurality of times; and (2) sums up a plurality of output values based on the respective phosphorescence components detected in the point (1) to set the sum as the output value of phosphorescence of the cycle (data of one pixel in the cycle).

More specifically, as shown in FIG. 1, the detection light L is turned on in a plurality of periods (hereinafter, also referred to as light-on periods for detection) while the detection light L is received in the light-on periods for detection. Also, excitation light, e.g., ultraviolet light (UV), is turned on in a certain period (hereinafter, also referred to as a light-on period for excitation). Light-off periods are also scheduled for after the light-on period for excitation. Phosphorescence is received in the light-off periods and the arithmetic logic unit calculates the output value (pixel value) of phosphorescence of one cycle as data of one pixel by summing up a plurality of output values (pixel values) based on the respective phosphorescence components received in the light-off periods.

In the present embodiment, phosphorescence is received in the light-off periods and the output values based on the respective phosphorescence components are summed up. This mode can acquire a high output value of phosphorescence from the entire light reception without a sufficient output value of phosphorescence in one time of light reception, thus increasing the S/N of output signals of phosphorescence. The increase in the S/N can reduce the amount of current required for the light sources in the light-on period for excitation. Also, receiving phosphorescence in the light-off periods and summing up the output values based on the received phosphorescence components eliminate the need to increase the time of each light-off period, i.e., the time of each phosphorescence reception period. Thus, each light-off period can be allocated to, for example, an electric charge reading period. This can reduce or prevent an increase in time required for one cycle.

As described above, the optical sensor of the present embodiment can increase the S/N of output signals while reducing or preventing an increase in time required for one cycle and issues related to a light source. In other words, the optical sensor can effectively detect phosphorescence while capturing a desired reflection image and/or a desired transmission image of a transported banknote. The optical sensor also can set the time required for one cycle to the same time as that in Comparative Embodiment 1 or shorter.

In the present embodiment, excitation light may be emitted in light-on periods for excitation, while fluorescence may be received in any of the light-on periods for excitation (at least one light-on period for excitation, e.g., at least the last light-on period for excitation in one cycle).

In this case, the light-off periods may be scheduled for any time after the at least one light-on period for excitation. For example, all of the light-off periods may be scheduled for after all of the light-on periods for excitation.

The intervals of the light-on periods for excitation are not limited. The second and subsequent periods may start before the intensity of phosphorescence becomes 0, i.e., before the phosphorescence disappears. Also, the intervals may or may not be constant.

The term "one cycle" herein means an imaging pattern in which the timing of turning on and off light-emitting elements that emit light components having various wavelength bands, the timing of reading signals, and other conditions are set. One cycle of imaging set as one period is repeated to acquire an image of the entire banknote. One cycle may show a periodical control pattern of turning on and off of detection light (or detection lights having a plurality of wavelength bands) and reception of the light(s).

<Structure of Optical Sensor>

Figure 2:
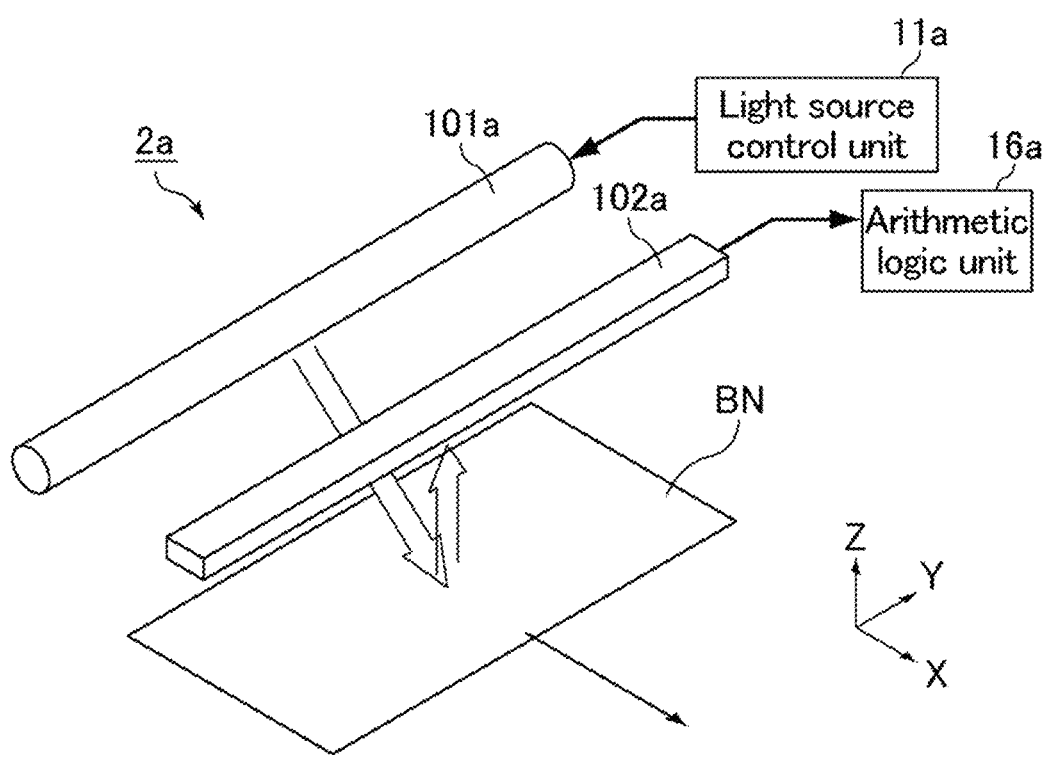
FIG. 2 is a schematic perspective view showing a possible structure of the optical sensor of Embodiment 1.
Figure 3:
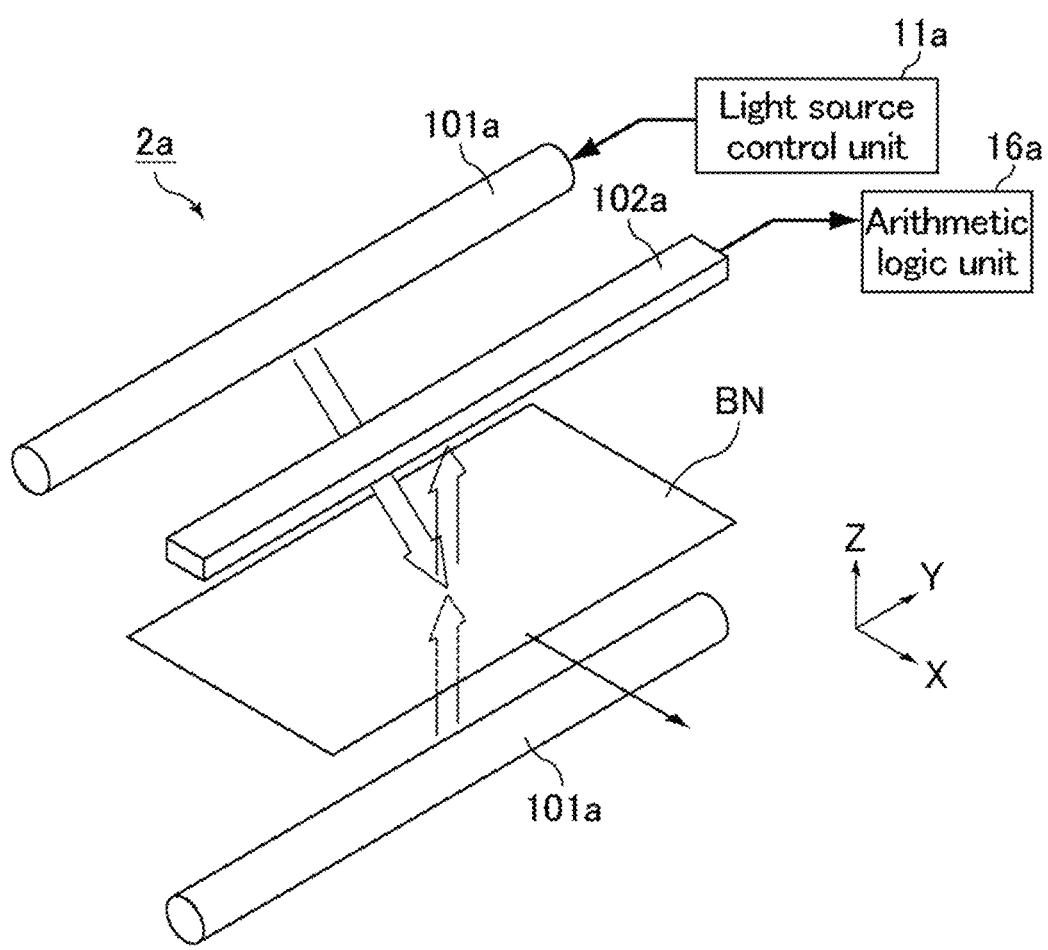
FIG. 3 is a schematic perspective view showing another possible structure of the optical sensor of Embodiment 1.

Next, the structure of the optical sensor of the present embodiment is described with reference to FIG. 2 and FIG. 3. As shown in FIG. 2 and FIG. 3, an optical sensor 2a of the present embodiment detects light reflected by a transported banknote BN and/or light transmitted through the banknote BN as well as light emitted from the banknote BN. The optical sensor 2a includes a light source 101a, a light receiving unit (light receiver) 102a, a light source control unit 11a, and an arithmetic logic unit 16a.

The banknote BN is transported in the X direction in the XY plane. The Y direction corresponds to the main scanning direction of the optical sensor 2a. The X direction corresponds to the sub-scanning direction of the optical sensor 2a. An ink containing a phosphorescent substance is printed on at least part of the banknote BN. An ink containing a fluorescent substance may be printed on at least part of the banknote BN. When irradiated with excitation light, a phosphorescent substance emits phosphorescence having a wavelength in the visible light range, for example, after the excitation light is turned off. A fluorescent substance emits fluorescence having a wavelength in the visible light range, for example, while being irradiated with the excitation light.

The light source 101a irradiates the banknote BN with excitation light and detection light. The optical sensor 2a may include a light source 101a on the same side as the light receiving unit 102a relative to the banknote BN as shown in FIG. 2, or may include a light source 101a on the same side as the light receiving unit 102a relative to the banknote BN and another light source 101a on the opposite side as shown in FIG. 3. The light source 101a on the same side as the light receiving unit 102a relative to the banknote BN may irradiate the banknote BN with excitation light. The light sources 101a may respectively emit excitation light and detection light linearly in the Y direction (main scanning direction) toward the banknote BN.

The type of the detection light and the type of the excitation light are not limited. The detection light may be at least one of white light, red light, green light, blue light, and infrared light. The excitation light may be visible light and/or ultraviolet light (UV). White light may include red light, green light, and blue light. Infrared light may include a plurality of infrared lights having different wavelength bands.

The light source control unit 11a controls turning on and off of the light source 101a. Specifically, under the control by the light source control unit 11a, the light source 101a, in one cycle, emits detection light in the light-on periods for detection and excitation light in the at least one light-on period for excitation, and is turned off in the light-off periods after the emission of the excitation light.

The types of detection lights emitted in the respective light-on periods for detection may be different from one another or may include the same types of lights.

When excitation light is emitted in a plurality of light-on periods for excitation, the types of excitation lights emitted in the respective light-on periods for excitation may be different from one another. Yet, the types of detection lights are usually the same as one another. The doses of excitation lights emitted in the respective light-on periods for excitation may be the same as or different from one another.

The term "dose" means a physical quantity proportional to the irradiation intensity of light and the irradiation time or reception time of the light.

The light source control unit 11a may cause the light source 101a to emit excitation light in light-on periods for excitation each sandwiched between two consecutive light-on periods for detection. The "light-on periods for excitation" belong to the same cycle. Yet, at least one of the two consecutive light-on periods for detection between which one of the light-on periods for excitation is sandwiched may belong to the cycle immediately before the above same cycle or to the cycle immediately after the above same cycle.

The light receiving unit 102a receives light resulting from reflection of detection light by the banknote BN and/or light resulting from transmission of the detection light through the banknote BN in each of the light-on periods for detection in one cycle. Specifically, the light receiving unit 102a receives at least one of reflection light, which results from reflection by the banknote BN of detection light emitted from the light source 101a on the same side as the light receiving unit 102a relative to the banknote BN, or transmission light, which results from transmission through the banknote BN of detection light emitted from the light source 101a on the side opposite to the light receiving unit 102a relative to the banknote BN. In the case of receiving reflection light and transmission light, the light receiving unit 102a may receive reflection light and transmission light in different light-on periods for detection. While the light source 101a emits detection light, the light receiving unit 102a receives light resulting from reflection of the detection light by the banknote BN and/or light resulting from transmission of the detection light through the banknote BN. The light receiving unit 102a then outputs an electric signal (which may be a digital signal) corresponding to the amount of incident light.

The light receiving unit 102a receives phosphorescence emitted from the banknote BN in each of the light-off periods after the emission of excitation light. After the excitation light is turned off, the phosphorescent substance keeps glowing for a period corresponding to the amount of excitation light applied thereto. Thus, the light receiving unit 102a can receive phosphorescence emitted from the banknote BN in the light-off periods after the emission of excitation light.

The light receiving unit 102a may receive fluorescence emitted from the banknote BN while the light source 101a irradiates the banknote BN with excitation light. The glow of fluorescence lasts during the emission of excitation light. Thus, the light receiving unit 102a can receive fluorescence emitted from the banknote BN in the light-on period for excitation.

The light source control unit 11a may cause the light source 101a to emit excitation light at least one time in one cycle before the light receiving unit 102a receives fluorescence emitted from the banknote BN.

The light receiving unit 102a may receive phosphorescence emitted from the banknote BN in at least one of the light-off periods in one cycle before receiving fluorescence emitted from the banknote BN.

The light source control unit 11a may keep the light source 101a turned off during the light-off periods after the emission of excitation light in the light-on periods for excitation in one cycle. The light receiving unit 102a may receive fluorescence emitted from the banknote BN in any of the second and subsequent periods of the light-on periods for excitation in which the light source 101a emits the excitation light and receive phosphorescence emitted after a lapse of the light-on periods for excitation from the banknote BN in the light-off periods in one cycle.

The light source control unit 11a may cause the light source 101a to emit excitation light at a first dose in a first light-on period for excitation among the plurality of light-on periods for excitation and emit excitation light at a second dose lower than the first dose in a second light-on period for excitation (scheduled for after the first period) among the plurality of light-on periods for excitation, and the light receiver 102a may receive fluorescence from a banknote BN while the light source 101a emits excitation light in the first light-on period for excitation and receive fluorescence from the banknote BN while the light source 101a emits excitation light in the second light-on period for excitation.

The light receiving unit 102a may include pixels arranged in a line in the Y direction (main scanning direction). In other words, the light receiving unit 102a may output electric signals (digital signals) corresponding to the respective amounts of incident lights at channels corresponding to the respective pixels (positions in the Y direction (main scanning direction)). Each pixel may include light receiving elements (imaging elements) that selectively receive lights having different wavelength bands.

The optical sensor 2a may have a function of invalidating (not validating) a signal of light incident on the light receiving unit 102a. Specifically, for example, the light receiving unit 102a may include a light receiving element, a capacitor configured to store electric charge from the light receiving element, and a hold switch configured to switch electrical connection between the light receiving element and the capacitor. Also, the light receiving unit 102a may be controlled to sequentially include, in one cycle, a first storage period of storing electric charge from the light receiving element in the capacitor, a transfer period of transferring electric charge stored in the capacitor, a discharge period of discharging the capacitor, and a second storage period of storing electric charge from the light receiving element. The light source 101a may irradiate a banknote BN with excitation light in the transfer period and/or the discharge period, and the hold switch may be in the off state during the transfer period so that the electrical connection between the light receiving element and the capacitor is terminated. This prevents, during the transfer period, contamination with an electric charge from the fluorescence components emitted from the banknote BN when irradiated with the excitation light. This mode therefore enables more accurate detection of the amount of electric charge from the detection light emitted in the first storage period. This combination of the first storage period, the transfer period, the discharge period, and the second storage period is scheduled at least one time in one cycle. The combination may be appropriately scheduled for any time suitable for the timing of excitation light emission.

The light receiving unit 102a may include a reset switch connected between the light receiving element and the capacitor. The light receiving unit 102a may also include a reed switch connected to one end of the capacitor to which the hold switch is connected. Electric charge generated in the light receiving element may be stored in the capacitor when the hold switch is in the on state and the reset switch and the reed switch are in the off state. The electric charge stored in the capacitor may be transferred when the reed switch is in the on state and the reset switch and the hold switch are in the off state, and may be released when the reset switch and the hold switch are in the on state and the reed switch is in the off state.

The arithmetic logic unit 16a generates data of one pixel by summing up the output values based on the respective phosphorescence components received by the light receiving unit 102a in the light-off periods in one cycle. Thus, the sum of the output values based on the phosphorescence components in one cycle is calculated as data of one pixel. This can increase the S/N of output signals while reducing or preventing an increase in time required for one cycle and issues related to a light source.

The arithmetic logic unit 16a may sum up output values (pixel values) that are of the same pixel (at the same channel), not of different pixels, and are based on phosphorescence belonging to the same cycle, for each wavelength band of light received by the light receiving elements. The arithmetic logic unit 16a may sum up output values (pixel values) of phosphorescence belonging to the same cycle for each channel. The output values to be summed up by the arithmetic logic unit 16a in the present embodiment are digital data, but may be analog data.

The light source control unit 11a and the arithmetic logic unit 16a may exhibit their functions when the later-described control unit (controller) 10 executes programs corresponding to the respective units.

Embodiment 2

Summary of the Present Embodiment

Figure 4:
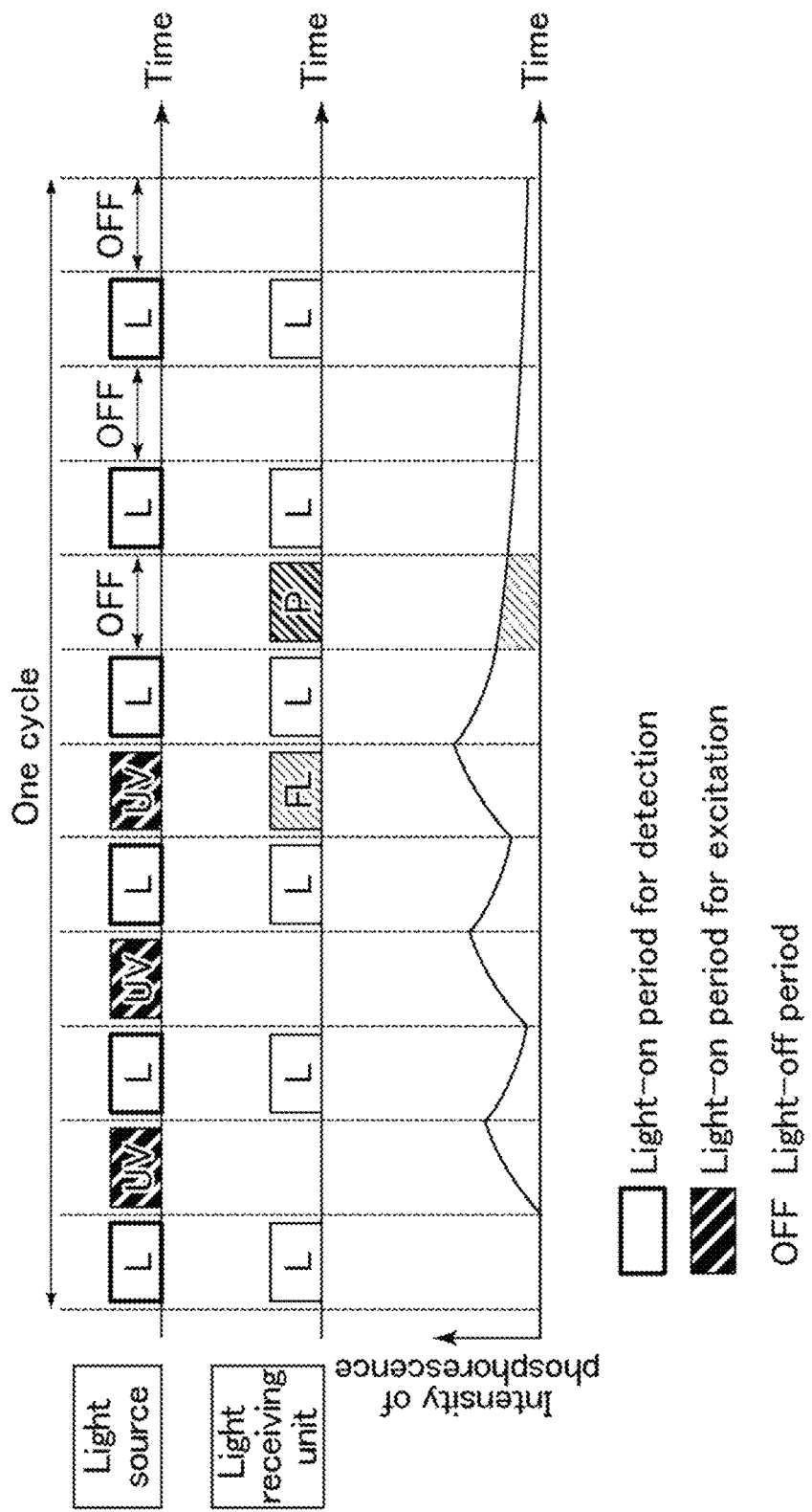
FIG. 4 is a view used to describe the outline of an optical sensor of Embodiment 2.

First, the present embodiment is summarized with reference to FIG. 4. An optical sensor of the present embodiment is different from the optical sensor of Comparative Embodiment 1, which irradiates a transported banknote with excitation light to detect fluorescence (FL) and phosphorescence (P) while acquiring a reflection image and/or a transmission image of the banknote, mainly in that the optical sensor in each cycle (1) applies excitation light a plurality of times.

More specifically, as shown in FIG. 4, the detection light L is turned on in a plurality of periods (light-on periods for detection) while the detection light L is received in the light-on periods for detection. Also, excitation light, e.g., ultraviolet light (UV), is turned on in a plurality of periods (light-on periods for excitation). A light-off period is also scheduled for after the light-on period for excitation. Phosphorescence is received in the light-off period. The output value (pixel value) based on the phosphorescence component received in the light-off period, i.e., the output value (pixel value) of phosphorescence of one cycle, is directly used as data of one pixel.

In the present embodiment, excitation light is emitted a plurality of times in light-on periods for excitation between the light-on periods for detection. This mode can achieve a high intensity of phosphorescence through all the light-on periods for excitation (by repeating the light-on period for excitation for a plurality of times) without a sufficient intensity of phosphorescence in one light-on period for excitation, thus increasing the S/N of output signals of phosphorescence. The increase in the S/N can reduce the amount of current required for the light sources in the light-on periods for excitation. Also, emitting the excitation light a plurality of times in the light-on periods for excitation eliminates the need to increase the time of each light-on period for excitation. Thus, each light-on period for excitation can be allocated to, for example, a period in which a light receiving element, e.g., photodiode, of the light receiving unit (light receiver) transfers or releases (resets) the electric charge stored in the light-on periods for detection (electric charge reading period).

As described above, the optical sensor of the present embodiment can increase the S/N of output signals while reducing or preventing an increase in time required for one cycle and issues related to a light source. In other words, the optical sensor can effectively detect phosphorescence while capturing a desired reflection image and/or a desired transmission image of a transported banknote. The optical sensor also can set the time required for one cycle to the same time as that in Comparative Embodiment 1 or shorter.

The light-off period in which phosphorescence is received may be scheduled for any time after at least two light-on periods for excitation. The light-off period may be scheduled for after all of the light-on periods for excitation.

The intervals of the light-on periods for excitation are not limited. The second and subsequent periods, as shown in FIG. 4, may start before the intensity of phosphorescence becomes 0, i.e., before the phosphorescence disappears. Also, the intervals may or may not be constant.

In the present embodiment, while excitation light is received in the light-on periods for excitation, fluorescence may be received in any of the light-on periods for excitation (at least one light-on period for excitation, e.g., at least the last light-on period for excitation in one cycle).

Also in the present embodiment, as shown in FIG. 4, in one cycle, excitation light may be emitted at least one time (during this time, fluorescence is not received) before fluorescence emitted from a banknote is received.

In the present embodiment, excitation light may be emitted one or more times to increase the intensity of phosphorescence (during this time, fluorescence is not received) for a time shorter than the emission time of excitation light for fluorescence detection. Here, in the case where excitation light is emitted a plurality of times to increase the intensity of phosphorescence, each time of excitation light emission to increase the intensity of phosphorescence may be shorter than the time of excitation light emission for fluorescence detection.

In the present embodiment, during emission of excitation light to increase the intensity of phosphorescence (during a period in which fluorescence is not received), light from a banknote may not be detected or may be invalidated (discarded or released).

<Structure of Optical Sensor>

Figure 5:
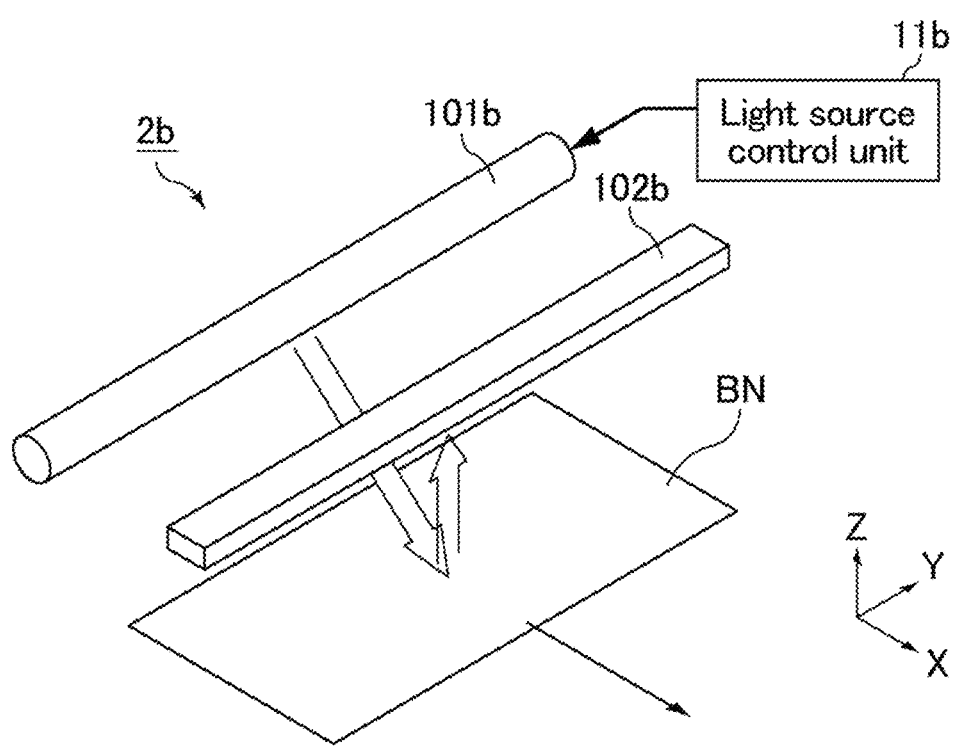
FIG. 5 is a schematic perspective view showing a possible structure of the optical sensor of Embodiment 2.
Figure 6:
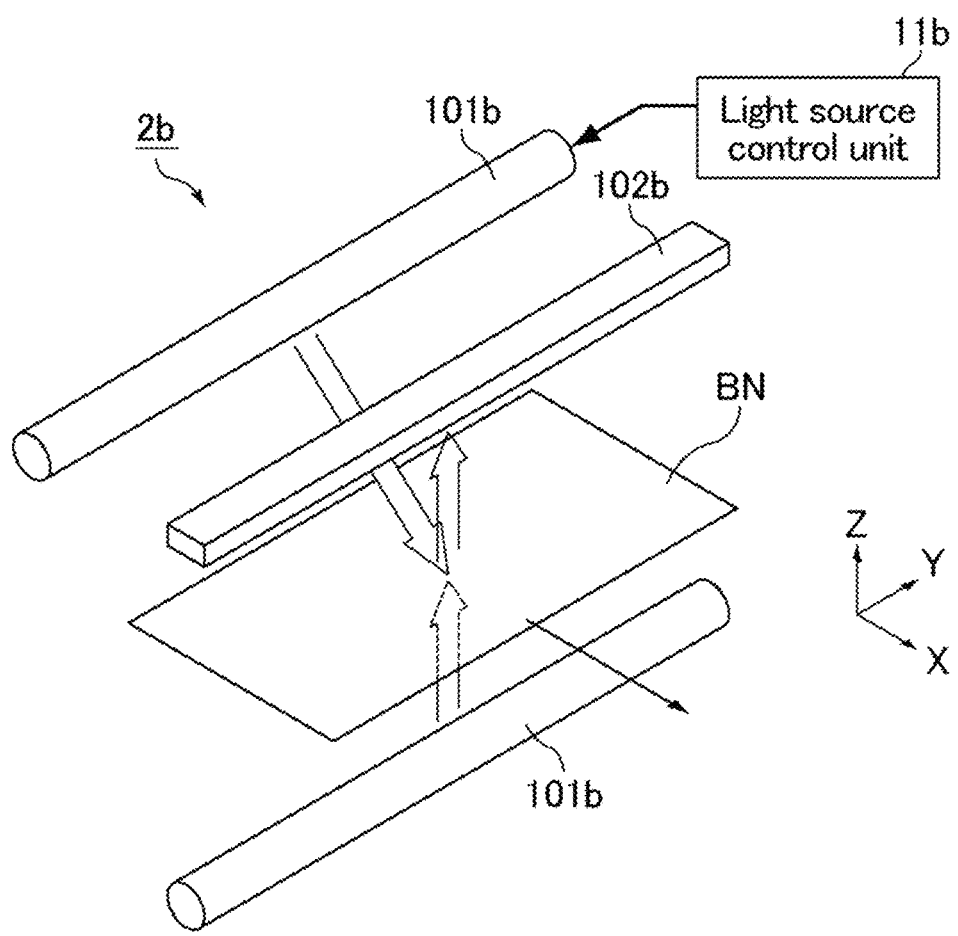
FIG. 6 is a schematic perspective view showing another possible structure of the optical sensor of Embodiment 2.

Next, the structure of the optical sensor of the present embodiment is described with reference to FIG. 5 and FIG. 6. As shown in FIG. 5 and FIG. 6, an optical sensor 2b of the present embodiment detects light reflected by a transported banknote BN and/or light transmitted through the banknote BN as well as light emitted from the banknote BN. The optical sensor 2b includes a light source 101b, a light receiving unit (light receiver) 102b, and a light source control unit 11b.

The banknote BN is transported in the X direction in the XY plane. The Y direction corresponds to the main scanning direction of the optical sensor 2b. The X direction corresponds to the sub-scanning direction of the optical sensor 2b. An ink containing a phosphorescent substance is printed on at least part of the banknote BN. An ink containing a fluorescent substance may be printed on at least part of the banknote BN. When irradiated with excitation light, a phosphorescent substance emits phosphorescence having a wavelength in the visible light range, for example, after the excitation light is turned off. A fluorescent substance emits fluorescence having a wavelength in the visible light range, for example, while being irradiated with the excitation light.

The light source 101a irradiates the banknote BN with excitation light and detection light. The optical sensor 2b may include a light source 101b on the same side as the light receiving unit 102b relative to the banknote BN as shown in FIG. 5, or may include a light source 101b on the same side as the light receiving unit 102b relative to the banknote BN and another light source 101b on the opposite side as shown in FIG. 6. The light source 101b on the same side as the light receiving unit 102b relative to the banknote BN may irradiate the banknote BN with excitation light. The light sources 101b may respectively emit excitation light and detection light linearly in the Y direction (main scanning direction) toward the banknote BN.

The type of the detection light and the type of the excitation light are not limited. The detection light may be at least one of white light, red light, green light, blue light, and infrared light. The excitation light may be visible light and/or ultraviolet light (UV). White light may include red light, green light, and blue light. Infrared light may include a plurality of infrared lights having different wavelength bands.

The light source control unit 11b controls turning on and off of the light source 101b. Specifically, under the control by the light source control unit 11b, the light source 101b, in one cycle, emits detection light in the light-on periods for detection and excitation light in the light-on periods for excitation each sandwiched between two consecutive light-on periods for detection, and is turned off in the light-off periods after the emission of the excitation light. The "light-on periods for excitation" belong to the same cycle. Yet, at least one of the two consecutive light-on periods for detection between which one of the light-on periods for excitation is sandwiched may belong to the cycle immediately before the above same cycle or to the cycle immediately after the above same cycle.

The types of detection lights emitted in the respective light-on periods for detection may be different from one another or may include the same types of lights.

The types of excitation lights emitted in the respective light-on periods for excitation may be different from one another, but are usually the same. The doses of excitation lights emitted in the respective light-on periods for excitation may be the same as or different from one another.

The light receiving unit 102b receives light resulting from reflection of detection light by the banknote BN and/or light resulting from transmission of the detection light through the banknote BN in each of the light-on periods for detection in one cycle. Specifically, the light receiving unit 102b receives at least one of reflection light, which results from reflection by the banknote BN of detection light emitted from the light source 101b on the same side as the light receiving unit 102b relative to the banknote BN, or transmission light, which results from transmission through the banknote BN of detection light emitted from the light source 101b on the side opposite to the light receiving unit 102b relative to the banknote BN. In the case of receiving reflection light and transmission light, the light receiving unit 102b may receive reflection light and transmission light in different light-on periods for detection. While the light source 101b emits detection light, the light receiving unit 102b receives light resulting from reflection of the detection light by the banknote BN and/or light resulting from transmission of the detection light through the banknote BN. The light receiving unit 102b then outputs an electric signal (which may be a digital signal) corresponding to the amount of incident light.

The light receiving unit 102b receives phosphorescence emitted from the banknote BN in the light-off period after the emission of excitation light. In the present embodiment, a high intensity of phosphorescence can be achieved since the excitation light is applied to a banknote BN in the light-on periods for excitation. This can increase the S/N of output signals while reducing or preventing an increase in time required for one cycle and issues related to a light source as described above. After the excitation light is turned off, the phosphorescent substance keeps glowing for a period corresponding to the amount of excitation light applied thereto. Thus, the light receiving unit 102b can receive phosphorescence emitted from the banknote BN in the light-off period after the emission of excitation light.

The light receiving unit 102b may receive fluorescence emitted from the banknote BN while the light source 101b irradiates the banknote BN with excitation light. The glow of fluorescence lasts during the emission of excitation light. Thus, the light receiving unit 102b can receive fluorescence emitted from the banknote BN in the light-on period for excitation.

The light source control unit 11b may cause the light source 101b to emit excitation light at least one time in one cycle before the light receiving unit 102b receives fluorescence emitted from the banknote BN.

The light source control unit 11b may keep the light source 101b turned off during the light-off period after the emission of excitation light in the light-on periods for excitation in one cycle. The light receiving unit 102b may receive fluorescence emitted from the banknote BN in any of the second and subsequent periods of the light-on periods for excitation in which the light source 101b emits the excitation light and receive phosphorescence emitted after a lapse of the light-on periods for excitation from the banknote BN in the light-off period in one cycle.

The light source control unit 11b may cause the light source 101b to emit excitation light at a first dose in a first light-on period for excitation among the plurality of light-on periods for excitation and emit excitation light at a second dose lower than the first dose in a second light-on period for excitation (scheduled for after the first period) among the plurality of light-on periods for excitation, and the light receiver 102b may receive fluorescence from a banknote BN while the light source 101b emits excitation light in the first light-on period for excitation and receive fluorescence from the banknote BN while the light source 101b emits excitation light in the second light-on period for excitation.

The light receiving unit 102b may include pixels arranged in a line in the Y direction (main scanning direction). In other words, the light receiving unit 102b may output, at channels corresponding to the respective pixels (positions in the Y direction (main scanning direction)), electric signals (digital signals) corresponding to the respective amounts of incident lights. Each pixel may include light receiving elements (imaging elements) that selectively receive lights having different wavelength bands.

The optical sensor 2b may have a function of invalidating (not validating) a signal of light incident on the light receiving unit 102b. Specifically, for example, the light receiving unit 102b may include a light receiving element, a capacitor configured to store electric charge from the light receiving element, and a hold switch configured to switch electrical connection between the light receiving element and the capacitor. Also, the light receiving unit 102b may be controlled to sequentially include, in one cycle, a first storage period of storing electric charge from the light receiving element in the capacitor, a transfer period of transferring electric charge stored in the capacitor, a discharge period of discharging the capacitor, and a second storage period of storing electric charge from the light receiving element. The light source 101b may irradiate a banknote BN with excitation light in the transfer period and/or the discharge period, and the hold switch may be in the off state during the transfer period so that the electrical connection between the light receiving element and the capacitor is terminated. This prevents, during the transfer period, contamination with an electric charge from the fluorescence components emitted from the banknote BN when irradiated with the excitation light. This mode therefore enables more accurate detection of the amount of electric charge from the detection light emitted in the first storage period. This combination of the first storage period, the transfer period, the discharge period, and the second storage period is scheduled at least one time in one cycle. The combination may be appropriately scheduled for any time suitable for the timing of excitation light emission.

The light receiving unit 102b may include a reset switch connected between the light receiving element and the capacitor. The light receiving unit 102b may also include a reed switch connected to one end of the capacitor to which the hold switch is connected. Electric charge generated in the light receiving element may be stored in the capacitor when the hold switch is in the on state and the reset switch and the reed switch are in the off state. The electric charge stored in the capacitor may be transferred when the reed switch is in the on state and the reset switch and the hold switch are in the off state, and may be released when the reset switch and the hold switch are in the on state and the reed switch is in the off state.

The light source control unit 11b may exhibit its functions when the later-described control unit (controller) 10 executes a program corresponding to the unit.

Embodiment 3

Summary of the Present Embodiment

Figure 7:
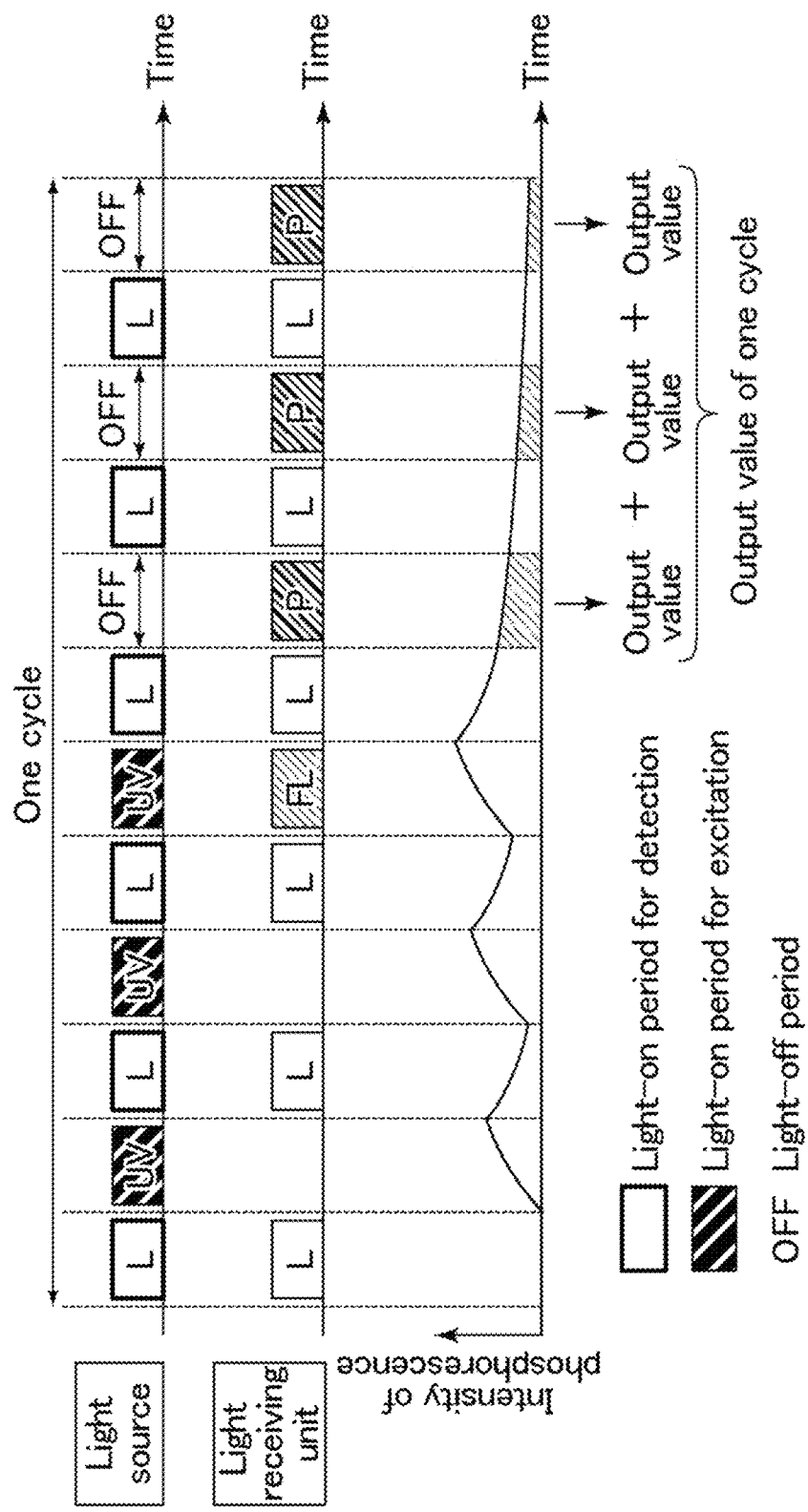
FIG. 7 is a view used to describe the outline of an optical sensor in a banknote handling device of Embodiment 3.

First, the present embodiment is summarized with reference to FIG. 7. An optical sensor of the present embodiment is different from the optical sensor of Comparative Embodiment 1, which irradiates a transported banknote with excitation light to detect fluorescence (FL) and phosphorescence (P) while acquiring a reflection image and/or a transmission image of the banknote, mainly in the following points: the optical sensor in each cycle (1) applies excitation light a plurality of times; (2) detects phosphorescence a plurality of times; and (3) sums up a plurality of output values based on the respective phosphorescence components detected in the point (2) to set the sum as the output value of phosphorescence of the cycle (data of one pixel in the cycle).

More specifically, as shown in FIG. 7, the detection light L is turned on in a plurality of periods (light-on periods for detection) while the detection light L is received in the light-on periods for detection. Also, excitation light, e.g., ultraviolet light (UV), is turned on in a plurality of periods (light-on periods for excitation) while fluorescence is received in any of the light-on periods for excitation (at least one light-on period for excitation, e.g., at least the last light-on period for excitation in one cycle). Light-off periods are also scheduled for after the light-on periods for excitation. Phosphorescence is received in the light-off periods and the arithmetic logic unit calculates the output value (pixel value) of phosphorescence of one cycle as data of one pixel by summing up a plurality of output values (pixel values) based on the respective phosphorescence components received in the light-off periods.

In the present embodiment, excitation light is emitted a plurality of times in light-on periods for excitation between the light-on periods for detection. This mode can achieve a high intensity of phosphorescence through all the light-on periods for excitation (by repeating the light-on period for excitation for a plurality of times) without a sufficient intensity of phosphorescence in one light-on period for excitation, thus increasing the S/N of output signals of phosphorescence. The increase in the S/N can reduce the amount of current required for the light sources in the light-on periods for excitation. Also, emitting the excitation light a plurality of times in the light-on periods for excitation eliminates the need to increase the time of each light-on period for excitation. Thus, each light-on period for excitation can be allocated to, for example, a period in which a light receiving element, e.g., photodiode, of the light receiving unit (light receiver) transfers or releases (resets) the electric charge stored in the light-on periods for detection (electric charge reading period).

Also in the present embodiment, phosphorescence is received in the light-off periods and the output values based on the phosphorescence components are summed up. This mode can achieve the same effect. In other words, this mode can acquire a high output value of phosphorescence from the entire light reception without a sufficient output value of phosphorescence in one time of light reception, thus increasing the S/N of output signals of phosphorescence. The increase in the S/N can reduce the amount of current required for the light sources in the light-on periods for excitation. Also, receiving phosphorescence in the light-off periods and summing up the output values based on the received phosphorescence components eliminate the need to increase the time of each light-off period, i.e., the time of each phosphorescence reception period. Thus, each light-off period can be allocated to, for example, an electric charge reading period. This can reduce or prevent an increase in time required for one cycle.

As described above, the optical sensor of the present embodiment can increase the S/N of output signals while reducing or preventing an increase in time required for one cycle and issues related to a light source. In other words, the optical sensor can effectively detect phosphorescence while capturing a desired reflection image and/or a desired transmission image of a transported banknote. The optical sensor also can set the time required for one cycle to the same time as that in Comparative Embodiment 1 or shorter.

Also in the present embodiment, as shown in FIG. 7, in one cycle, excitation light is emitted at least one time (during this time, fluorescence is not received) before fluorescence emitted from a banknote is received.

In the present embodiment, excitation light may be emitted one or more times to increase the intensity of phosphorescence (during this time, fluorescence is not received) for a time shorter than the emission time of excitation light for fluorescence detection. Here, in the case where excitation light is emitted a plurality of times to increase the intensity of phosphorescence, each time of excitation light emission to increase the intensity of phosphorescence may be shorter than the time of excitation light emission for fluorescence detection.

In the present embodiment, during emission of excitation light to increase the intensity of phosphorescence (during a period in which fluorescence is not received), light from a banknote may not be detected or may be invalidated (discarded or released).

The light-off periods may be scheduled for any time after at least one light-on period for excitation. In the present embodiment, the case is described in which all of the light-off periods are scheduled for after all of the light-on periods for excitation. In other words, in the present embodiment, as shown in FIG. 7, the light source is kept turned off during the turn-off periods after the emission of excitation light in the light-on periods for excitation. Fluorescence emitted from a banknote in any of the second and subsequent periods of the light-on periods for excitation in which the excitation light is emitted is received while phosphorescence emitted after a lapse of the light-on periods for excitation from the banknote is received in each of the light-off periods.

The intervals of the light-on periods for excitation are not limited. As shown in FIG. 7, any of the second and subsequent periods may start before the intensity of phosphorescence becomes 0, i.e., before the phosphorescence disappears. Also, the intervals may or may not be constant.

<Structure of Banknote Handling Device>

Figure 8:
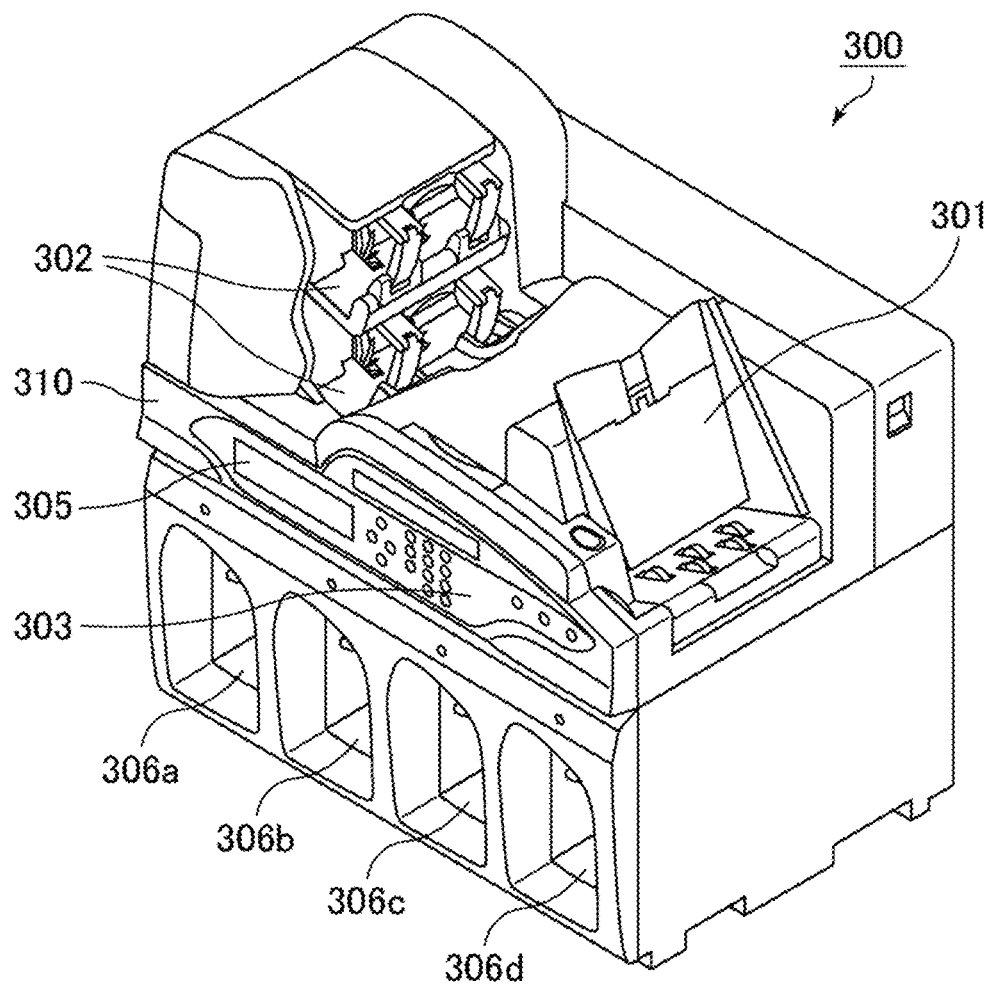
FIG. 8 is a schematic perspective view showing the appearance of the banknote handling device of Embodiment 3.

Next, the structure of a banknote handling device of the present embodiment including the optical sensor of the present embodiment is described with reference to FIG. 8. The banknote handling device of the present embodiment may have a structure shown in FIG. 8, for example. A banknote handling device 300 in FIG. 8 includes the optical sensor described above (not shown in FIG. 8), as well as a banknote recognition unit (not shown in FIG. 8) that executes the banknote recognition processing; a hopper 301 in which a plurality of banknotes to be handled can be stacked; two rejectors 302 each of which feeds out a banknote determined as a reject note; an operation unit 303 with which the operator inputs commands; four stackers 306*a* to 306*d* into each of which banknotes whose denomination, authenticity, and fitness have been recognized in a housing 310 are sorted and stacked; and a display 305 that displays information including the banknote recognition and counting results and the stacking status in each of the stackers 306*a* to 306*d*.

<Structure of Imaging Unit>

Figure 9:
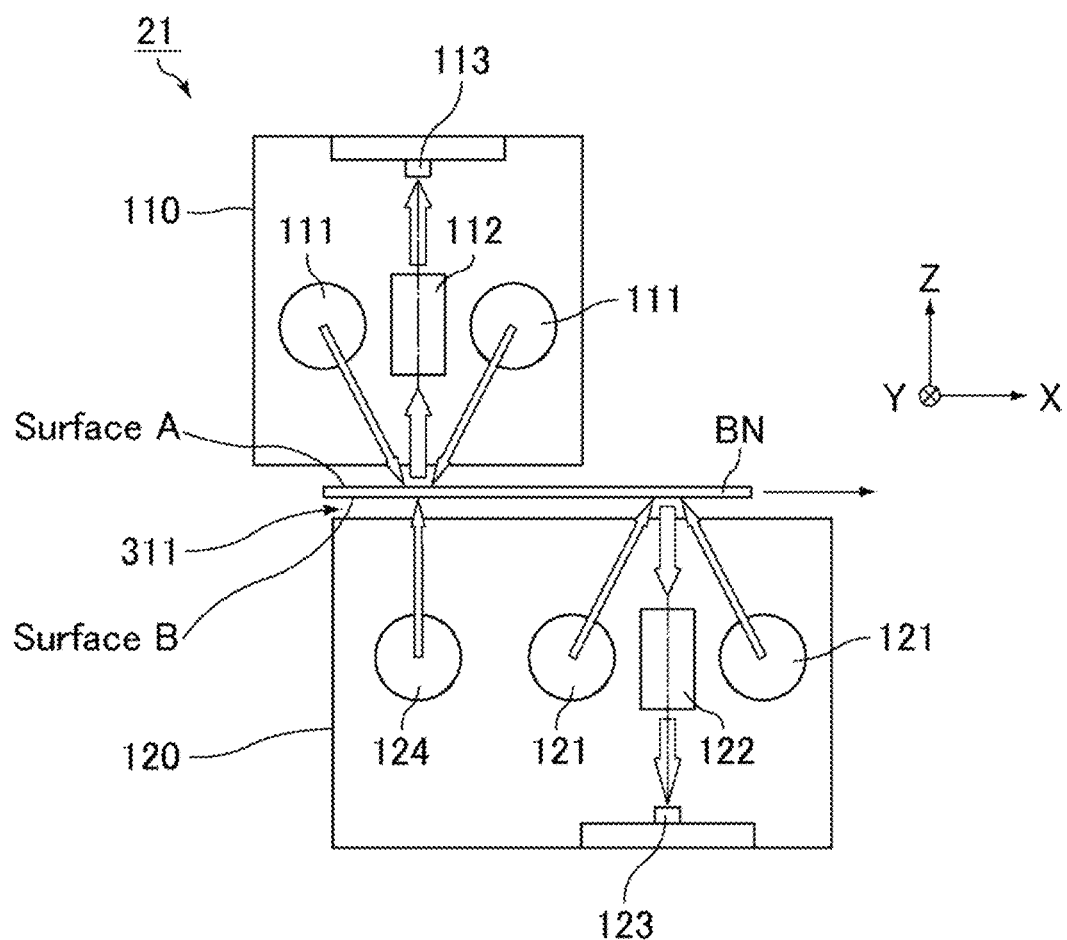
FIG. 9 is a schematic cross-sectional view showing the structure of an imaging unit in the banknote handling device of Embodiment 3.

Next, the structure of an imaging unit, which is the key device of the banknote recognition unit of the present embodiment, is described with reference to FIG. 9. As shown in FIG. 9, an imaging unit 21 includes an upper unit 110 and a lower unit 120 opposing each other. A space in which banknotes BN are transported in the X direction in the XY plane is formed between the upper unit 110 and the lower unit 120 spaced from each other in the Z direction. This space defines part of a transport path 311 of the banknote handling device of the present embodiment. The upper unit 110 and the lower unit 120 are positioned above (+Z direction) and below (−Z direction) the transport path 311, respectively. The Y direction corresponds to the main scanning direction of the imaging unit 21. The X direction corresponds to the sub-scanning direction of the imaging unit 21.

As shown in FIG. 9, the upper unit 110 includes two reflection light sources 111, a condensing lens 112, and a light receiving unit (light receiver) 113. The reflection light sources 111 each include light emitting elements that emit lights having different wavelength bands and sequentially irradiate a main surface (hereinafter, surface A) of each banknote BN facing the light receiving unit 113 with lights having different wavelength bands. The condensing lens 112 collects light emitted from the reflection light sources 111 and reflected by the surface A of a banknote BN, light emitted from a transmission light source 124 in the lower unit 120 and transmitted through the banknote BN, and fluorescence and phosphorescence emitted from the surface A of the banknote BN. The light receiving unit 113 receives light collected by the condensing lens 112 and converts the light to electrical signals corresponding to the amount of incident light. The light receiving unit 113 then amplifies the electrical signals, converts the amplified signals to digital data by A/D conversion, and outputs the digital data as image signals.

The lower unit 120 includes two reflection light sources 121, the transmission light source 124, a condensing lens 122, and a light receiving unit (light receiver) 123. The reflection light sources 121 have the same structure as the reflection light sources 111. The condensing lens 122 collects light emitted from the reflection light sources 121 and reflected by a main surface (hereinafter, surface B) of the banknote BN facing the light receiving unit 123 and fluorescence and phosphorescence emitted from the surface B of the banknote BN. The light receiving unit 123 receives light collected by the condensing lens 122 and outputs image signals as with the light receiving unit 113.

The transmission light source 124 is on the optical axis of the condensing lens 112 in the upper unit 110. Part of light emitted from the transmission light source 124 is transmitted through the banknote BN, collected by the condensing lens 112 in the upper unit 110, and detected by the light receiving unit 113.

The lights having different wavelength bands are, for example, lights of different colors in the case of visible light, and lights whose wavelength bands overlap one another or lights whose wavelength bands do not overlap one another in the cases of infrared light and ultraviolet light.

Each of the light sources 111, 121, and 124 emits detection light. The type of detection light emitted from each of the light sources 111, 121, and 124 is not limited. The light sources 111, 121, and 124 may emit lights having different wavelength bands as detection light. Examples of the detection light emitted from each of the light sources 111, 121, and 124 include visible light and infrared light. Examples of visible light include red light (R), green light (G), blue light (B), and white light (W) including the lights of these three colors. Infrared light may include, for example, two or more infrared lights having different wavelength bands. The two or more infrared lights having different wavelength bands may have different peak wavelengths. The light sources 111 and 121 each emit excitation light. Non-limiting examples of the excitation light emitted from each of the light sources 111 and 121 include visible light and ultraviolet light (UV).

Detection light is emitted to detect reflection light and/or transmission light from a transported banknote. Excitation light excites a fluorescent substance and a phosphorescent substance. A fluorescent substance excited by excitation light emits fluorescence. A phosphorescent substance excited by excitation light emits phosphorescence. In other words, a transported banknote with an ink containing a fluorescent substance emits fluorescence when irradiated with excitation light, while a banknote with an ink containing a phosphorescent substance emits phosphorescence when irradiated with excitation light. From both the surfaces A and B of each banknote, fluorescence having a wavelength in the visible light range and phosphorescence having a wavelength in the visible light range are received.

Figure 10:
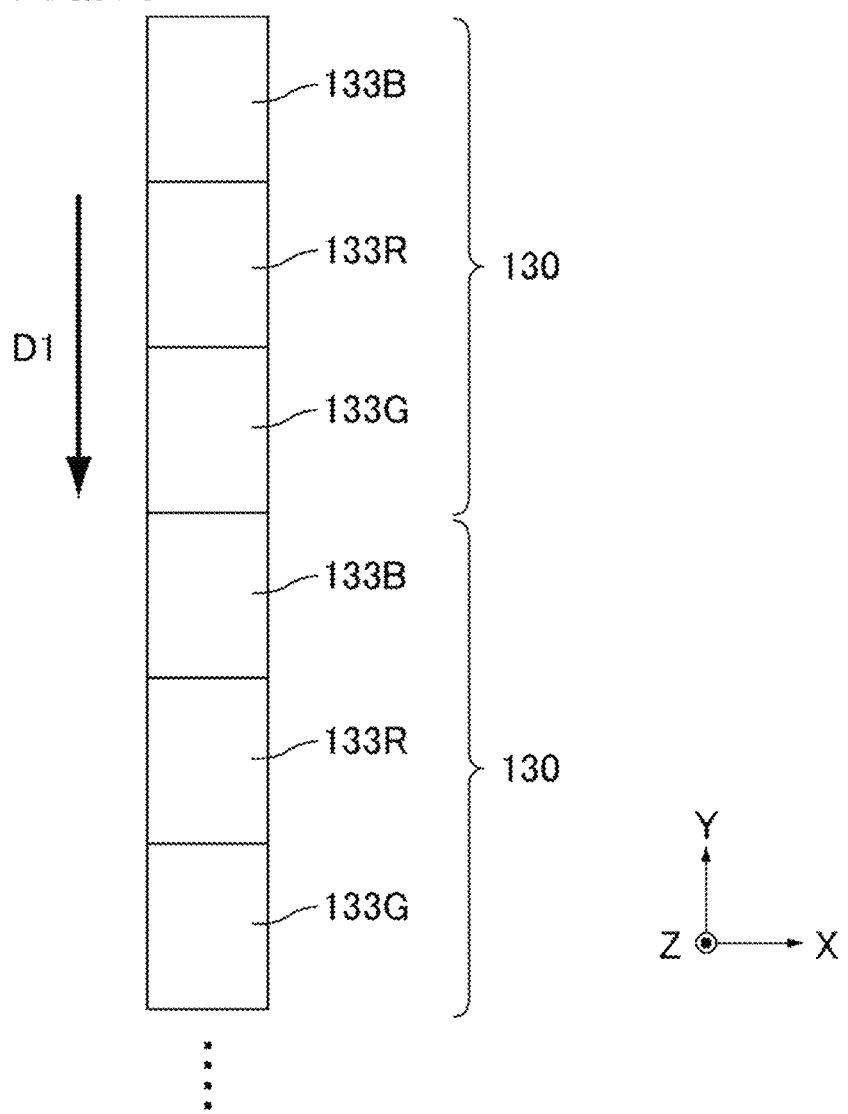
FIG. 10 is a schematic plan view showing the arrangement of light receiving elements of a light receiving unit in the banknote handling device of Embodiment 3.

As shown in FIG. 10, each of the light receiving units 113 and 123 includes pixels 130 arranged in a line in the main scanning direction D1 (Y direction). In other words, each of the light receiving units 113 and 123 outputs image signals corresponding to the respective amounts of incident lights at channels corresponding to the respective pixels (positions in the main scanning direction D1 (Y direction)). Each pixel 130 may include three light receiving elements (imaging elements) arranged in a line in the main scanning direction D1, i.e., a light receiving element that receives blue light (hereinafter, also referred to as a blue light receiving element) 133B, a light receiving element that receives red light (hereinafter, also referred to as a red light receiving element) 133R, and a light receiving element that receives green light (hereinafter, also referred to as a green light receiving element) 133G. Each of the light receiving elements 133B, 133R, and 133G outputs an electrical signal corresponding to the amount of incident light. Any of the light receiving elements 133B, 133R, and 133G may receive infrared light as well as the light of the corresponding color.

<Structure of Banknote Recognition Unit>

Figure 11:
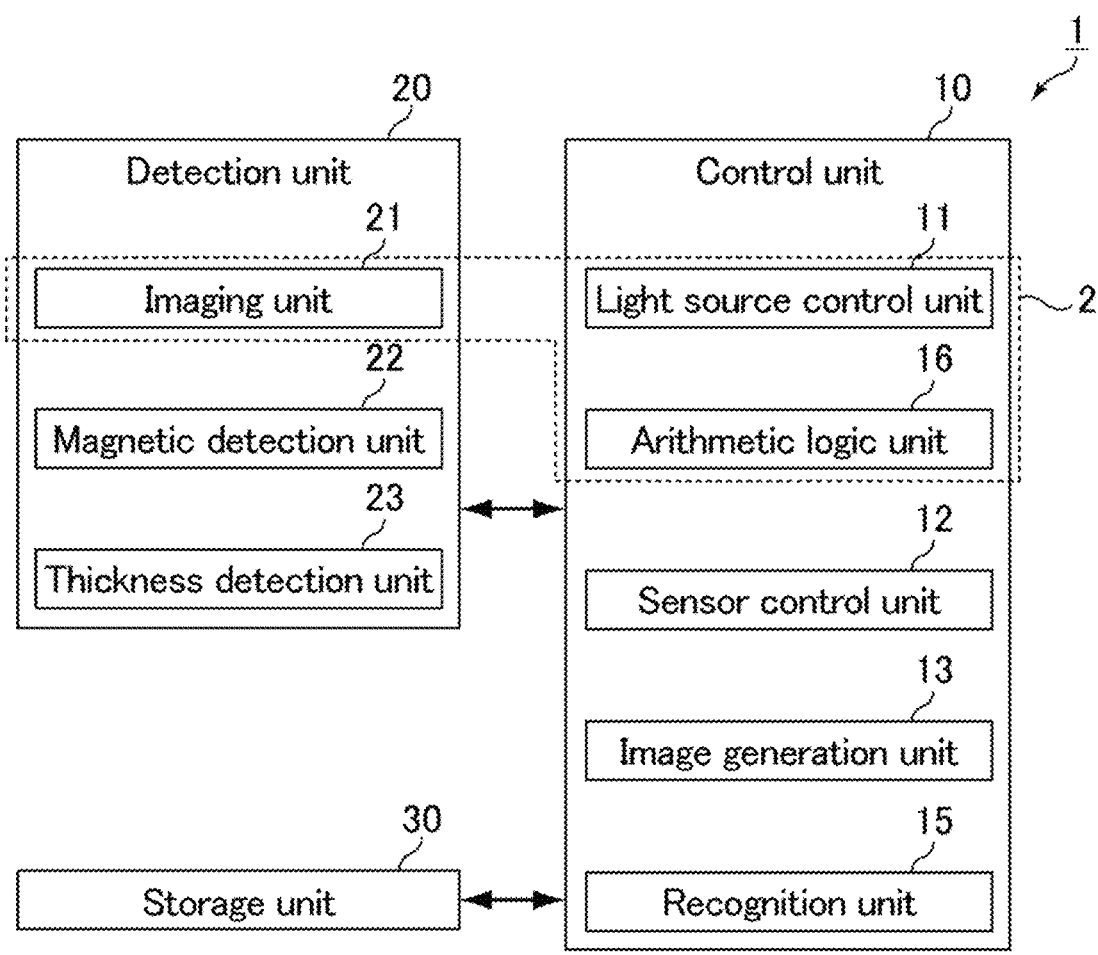
FIG. 11 is a block diagram showing the structure of the banknote handling device of Embodiment 3.

The structure of the banknote recognition unit of the present embodiment is described with reference to FIG. 11. As shown in FIG. 11, a banknote recognition unit 1 of the present embodiment includes a control unit (controller) 10, a detection unit 20, and a storage unit 30.

The control unit 10 includes, for example, programs for executing various processings stored in the storage unit 30, a central processing unit (CPU) that executes the programs, and various hardware devices (e.g., field programmable gate array (FPGA)) controlled by the CPU. The control unit 10 controls the components of the banknote recognition unit 1 following the programs stored in the storage unit 30. The control unit 10 executes the programs stored in the storage unit 30 to exhibit the functions of the light source control unit 11, a sensor control unit 12, an image generation unit 13, a recognition unit 15, and an arithmetic logic unit 16.

The detection unit 20 detects various characteristics of individual transported banknotes and may include a magnetic detection unit 22 and a thickness detection unit 23 as well as the imaging unit 21 along the transport path of banknotes. The imaging unit 21 captures images of each banknote and outputs image signals (image data) as described above. In the present embodiment, the light source control unit 11 and the arithmetic logic unit 16 in the control unit 10 and the imaging unit 21 in the detection unit 20 define an optical sensor 2 of the present embodiment.

The storage unit 30 is defined by a nonvolatile storage device such as a semiconductor memory or a hard disk. The storage unit 30 stores programs and data necessary for the control of the banknote recognition unit 1. The storage unit 30 also stores imaging parameters such as the wavelength bands of lights to be emitted from each of the light sources 111, 121, and 124 during imaging in one cycle by the imaging unit 21; the timings of turning on and off each of the light sources 111, 121, and 124; the forward current values to be supplied to each LED element of each of the light sources 111, 121, and 124; and the timings of reading signals from each of the upper unit 110 and the lower unit 120.

The light source control unit 11 dynamically controls the light sources 111, 121, and 124 to capture images of individual banknotes using the light from each of the light sources 111, 121, and 124. Specifically, the light source control unit 11 controls turning on and off of each of the light sources 111, 121, and 124 based on the timings set as the imaging parameters. This control is executed using a mechanical clock that varies depending on the transport speed of a banknote and a system clock that is output at a constant frequency regardless of the transport speed of a banknote.

The sensor control unit 12 controls the timings of reading image signals from each of the upper unit 110 and the lower unit 120 based on the timings set as the imaging parameters and reads the image signals from each of the upper unit 110 and the lower unit 120 synchronously with the timings of turning on and off each of the light sources 111, 121, and 124. This control is executed using the mechanical clock and the system clock.

The arithmetic logic unit 16 sums up, for each channel, image signals of phosphorescence components belonging to the same cycle among image signals read by the sensor control unit 12. In other words, the arithmetic logic unit 16 generates data of one pixel by summing up, for each channel, output values based on the respective phosphorescence components received by the light receiving unit 113 in light-off periods in one cycle. The arithmetic logic unit 16 also generates data of one pixel by summing up, for each channel, output values based on the respective phosphorescence components received by the light receiving unit 123. More specifically, the arithmetic logic unit 16 sums up pixel values of image signals that are of the same pixel (at the same channel), not of different pixels, and are based on phosphorescence components belonging to the same cycle, for each channel and for each wavelength band of light received by the light receiving elements. The output values to be summed up by the arithmetic logic unit 16 of the present embodiment are digital data, but may be analog data.

The sensor control unit 12 then sequentially stores the read image data (including the image signals of phosphorescence components summed up by the arithmetic logic unit 16), i.e., line data, in the ring buffer (line memory) of the storage unit 30.

Here, the line data means data based on image signals obtained by one-time or multiple-time image capturing using each of the upper unit 110 and the lower unit 120, and corresponds to data on one line in the lateral direction (direction orthogonal to the transport direction of banknotes) of the acquired image. In the case of usual light (detection light and fluorescence) except for phosphorescence, image signals obtained by one-time image capturing are directly used as line data. In the case of phosphorescence, the sum of output values (pixel values) of image signals obtained by multiple-time image capturing is used as line data.

The image generation unit 13 functions to generate an image based on various signals related to a banknote acquired from the detection unit 20. Specifically, the image generation unit 13 decomposes data (image signals) stored in the ring buffer into data on each condition of light emission and reception.

The image generation unit 13 then executes correction such as dark current cutting, gain adjustment, and correction of light current level according to the characteristics of the decomposed piece of data so as to generate various types of image data of a banknote and store the data in the storage unit 30.

The timing of summing up image signals of phosphorescence by the arithmetic logic unit 16 is not limited to the example above (i.e., before the sensor control unit 12 stores the image signals in the ring buffer). The timing may be scheduled for, for example, any time after the sensor control unit 12 stores the image signals in the ring buffer and before the image generation unit 13 decomposes data, any time after the image generation unit 13 decomposes data and before the image generation unit 13 executes correction, or any time after the image generation unit 13 executes correction.

The recognition unit 15 uses various signals related to a banknote acquired from the detection unit 20 to execute recognition. The recognition unit 15 recognizes at least the denomination and authenticity of the banknote. The recognition unit 15 may function to determine the fitness of the banknote. In this case, the recognition unit 15 detects a stained/soiled portion, a folded portion, and a torn portion of the banknote, for example, as well as tape attached to the banknote based on the thickness of the banknote, so as to determine whether the banknote should be handled as a fit note suitable for circulation or as an unfit note unsuitable for circulation.

The recognition unit 15 may use image data generated by the image generation unit 13 when using images of a banknote captured by the imaging unit 21 for recognition of the denomination, authenticity, and fitness, for example.

The recognition unit 15 may determine the existence of phosphorescence based on the sum of the output values calculated by the arithmetic logic unit 16. For example, the recognition unit 15 may compare the sum calculated by the arithmetic logic unit 16 with a predetermined threshold and determine that the banknote emits phosphorescence when the sum exceeds the predetermined threshold and that the banknote does not emit phosphorescence when the sum does not exceed the predetermined threshold. Also, the recognition unit 15 may recognize the authenticity of a banknote based on the determination result of the existence of phosphorescence. For example, the recognition unit 15 may determine the banknote as a genuine note when determining that the banknote emits phosphorescence in the determination target area (e.g., when the number of pixels where phosphorescence is detected in the determination target area is more than a predetermined number), while determining the banknote as a counterfeit note when determining that the banknote does not emit phosphorescence in the determination target area (e.g., when the number of pixels where phosphorescence is detected in the determination target area is not more than the predetermined number). The determination target area may be a region preset on the banknote based on its denomination and may correspond to part of the banknote.

<Light Source Control Method and Data Acquisition Timing by Light Receiving Unit>

Figure 12:
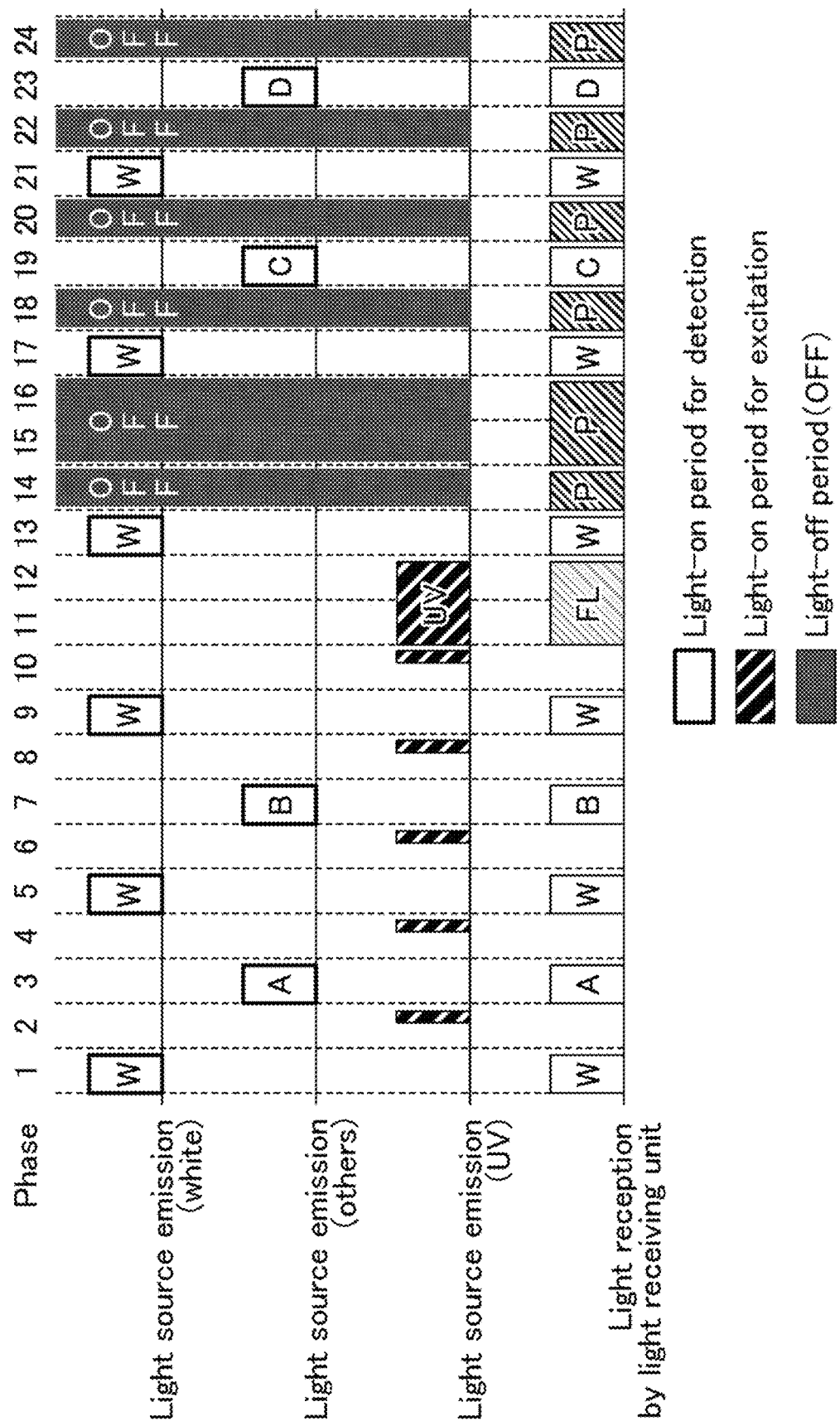
FIG. 12 is a timing chart showing the timing of turning on of a light source and the timing of light reception by a light receiving unit in the banknote handling devices of Embodiments 3 and 4.

The control (light-on timing) of each of the light sources 111, 121, and 124 by the light source control unit 11 and the timing of light reception by each of the light receiving units 113 and 123 are described with reference to FIG. 12. FIG. 12 shows the details of turning on of each light source and light reception and the timings thereof. In FIG. 12, W indicates white light, UV indicates ultraviolet light, A to D indicate first infrared light (IR1), second infrared light (IR2), first infrared light (TIR1) transmitted through a banknote, and green light (TG) transmitted through a banknote, respectively, FL indicates fluorescence, and P indicates phosphorescence.

The lower unit 120 is controlled in the same manner as the upper unit 110, except that transmission light (first infrared light transmitted through a banknote and green light transmitted through a banknote) is not detected. Thus, description thereof is omitted below.

As shown in FIG. 12, the upper unit 110 repeats a cycle of 24 phases to acquire image data of the entire surface of a banknote. The lengths of the phases are the same as one another. The length of one phase in the present embodiment corresponds to half the length of one phase in Comparative Embodiment 1 shown in FIG. 20.

As shown in FIG. 12, at the imaging position for the upper unit 110, the light sources 111 emit white light W and the light receiving unit 113 receives the white light W reflected by a banknote in phase 1 of one cycle. Then, in the latter half of phase 2, the light sources 111 emit ultraviolet light UV. In phase 3, the light sources 111 or the light source 124 emit(s) light A and the light receiving unit 113 receives the light A reflected by or transmitted through the banknote. In the latter half of phase 4, the light sources 111 emit ultraviolet light UV. In phase 5, the light sources 111 emit white light W and the light receiving unit 113 receives the white light W reflected by the banknote. In the latter half of phase 6, the light sources 111 emit ultraviolet light UV. In phase 7, the light sources 111 or the light source 124 emit(s) light B and the light receiving unit 113 receives the light B reflected by or transmitted through the banknote. In the latter half of phase 8, the light sources 111 emit ultraviolet light UV. In phase 9, the light sources 111 emit white light W and the light receiving unit 113 receives the white light W reflected by the banknote. In the latter half of phase 10, the light sources 111 emit ultraviolet light UV. In the present embodiment, the ultraviolet light UV emission in phases 2, 4, 6, 8, and 10 is executed in the latter half of each phase. Yet, the ultraviolet light UV emission may be executed in the former half of each phase. In the case of executing phosphorescence detection in phases in the latter half of one cycle, ultraviolet light UV emission may be executed in the latter half of each phase in consideration of the accumulation degree of light.

In phase 11 to phase 12, the light sources 111 emit ultraviolet light UV and the light receiving unit 113 receives fluorescence from the banknote. In phase 13, the light sources 111 emit white light W and the light receiving unit 113 receives the white light W reflected by the banknote. In phase 14, the light sources are turned off and the light receiving unit 113 receives phosphorescence from the banknote. In phase 15 to phase 16, the light sources are turned off and the light receiving unit 113 receives phosphorescence from the banknote. In phase 17, the light sources 111 emit white light W and the light receiving unit 113 receives the white light W reflected by the banknote. In phase 18, the light sources are turned off and the light receiving unit 113 receives phosphorescence from the banknote. In phase 19, the light sources 111 or the light source 124 emit(s) light C and the light receiving unit 113 receives the light C reflected by or transmitted through the banknote. In phase 20, the light sources are turned off and the light receiving unit 113 receives phosphorescence from the banknote. In phase 21, the light sources 111 emit white light W and the light receiving unit 113 receives the white light W reflected by the banknote. In phase 22, the light sources 111 are turned off and the light receiving unit 113 receives phosphorescence from the banknote. In phase 23, the light sources 111 or the light source 124 emit(s) light D and the light receiving unit 113 receives the light D reflected by or transmitted through the banknote. In phase 24, the light sources are turned off and the light receiving unit 113 receives phosphorescence from the banknote. The UV emission in phases 11 and 12 may be executed separately from the UV emission in phase 10 or continuously from the UV emission in phase 10, depending on the ease of control. Also, phosphorescence detection in phases 15 and 16 may be executed separately from phosphorescence detection in phase 14 or continuously from phosphorescence detection in phase 14, depending on the ease of control.

In the present embodiment, the respective images based on light A, light B, light C, and light D are each acquired in one phase, while reflection images based on white light W are acquired in six phases. The reflection images based on white light W each have a resolution that is six times the resolution of each of the respective images based on light A, light B, light C, and light D in the sub-scanning direction.

As shown in FIG. 12, the light sources 111 and 124 each emit detection light in the light-on periods for detection (phases 1, 3, 5, 7, 9, 13, 17, 19, 21, and 23). Also, the light sources 111 emit ultraviolet light UV in the light-on periods for excitation (phases 2, 4, 6, 8, 10, and 11 to 12) in one cycle. The light receiving units 113 and 123 each receive reflection light and/or transmission light from the banknote in the light-on periods for detection (phases 1, 3, 5, 7, 9, 13, 17, 19, 21, and 23) and receive phosphorescence emitted from the banknote in the light-off periods (phases 14, 15 to 16, 18, 20, 22, and 24).

The arithmetic logic unit 16 calculates the output value based on the respective phosphorescence components in one cycle as data of one pixel by summing up the output values based on the respective phosphorescence components received by the light receiving unit 113 in the light-off periods (phases 14, 15 to 16, 18, 20, 22, and 24). This mode can increase the S/N of image signals based on the phosphorescence components as described above. The mode can also reduce the amount of current required for the light sources in the light-on periods for excitation. The mode also can reduce or prevent an increase in time required for one cycle. Likewise, the arithmetic logic unit 16 calculates the output value based on the phosphorescence components in one cycle as data of one pixel by summing up the output values based on the respective phosphorescence components received by the light receiving unit 123 in the light-off periods (phases 14, 15 to 16, 18, 20, 22, and 24).

In the present embodiment, the light-off periods (phases 14, 15 to 16, 18, 20, 22, and 24) are scheduled for after all of the light-on periods for excitation (phases 2, 4, 6, 8, 10, and 11 to 12) in one cycle.

The light source control unit 11 causes the light sources 111 to emit ultraviolet light UV in the light-on periods for excitation (phases 2, 4, 6, 8, 10, and 11 to 12) each sandwiched between two consecutive light-on periods for detection, namely phases 1 and 3, phases 3 and 5, phases 5 and 7, phases 7 and 9, and phases 9 and 13. This mode can also increase the S/N of image signals based on the phosphorescence components as described above. The mode also can reduce the amount of current required for the light sources in the light-on periods for excitation. The mode also can reduce or prevent an increase in time required for one cycle.

In the present embodiment, two consecutive light-on periods for detection between which a light-on period for excitation is sandwiched belong to the same cycle. These light-on periods for detection may belong separately to two consecutive cycles. For example, when one cycle consists of phase 1 as a light-on period for excitation and phases 2 to 24 corresponding to phases 1 to 23 shown in FIG. 12, the light-on period for excitation as phase 1 of a cycle corresponds to a light-on period for excitation sandwiched between the light-on period for detection as phase 2 of the cycle in question and the light-on period for detection as phase 24 in the cycle immediately before the cycle in question.

The light receiving unit 113 receives fluorescence emitted from the banknote in at least one (phases 11 to 12) of the light-on periods for excitation (phases 2, 4, 6, 8, 10, and 11 to 12). In this manner, the optical sensor 2 of the present embodiment can detect fluorescence emitted from a sheet as well as phosphorescence.

The light source control unit 11 causes the light sources 111 to emit ultraviolet light UV at least one time (phases 2, 4, 6, 8, and 10) before the light receiving unit 113 receives fluorescence emitted from the banknote BN (before phases 11 to 12) in one cycle.

The light source control unit 11 also keeps the light sources 111 turned off during the light-off periods (phases 14, 15 to 16, 18, 20, 22, and 24) after the emission of ultraviolet light UV in the light-on periods for excitation (phases 2, 4, 6, 8, 10, and 11 to 12). The light receiving unit 113 receives fluorescence emitted from the banknote BN in any of the second and subsequent periods (here, phases 11 to 12) of the light-on periods for excitation (phases 2, 4, 6, 8, 10, and 11 to 12) in which the light sources 111 emit ultraviolet light UV, and receives phosphorescence emitted after the lapse of the light-on periods for excitation (phases 2, 4, 6, 8, 10, and 11 to 12) from the banknote BN in each of the light-off period (phases 14, 15 to 16, 18, 20, 22, and 24).

The light source control unit 11 emits excitation light to increase the intensity of phosphorescence (each of phases 2, 4, 6, 8, and 10 in each of which fluorescence is not received) at least one time (here, five times) for a time shorter than the ultraviolet light UV emission time for fluorescence detection (the ultraviolet light UV emission time in phases 11 to 12).

Embodiment 4

In the present embodiment, the features unique to the present embodiment are mainly described, and the same features as in the embodiments above are not described in detail below. A banknote handling device of the present embodiment has the same structure as that of Embodiment 3 except that the details of turning on of each light source and light reception related and the timings thereof are as shown in FIG. 13.

Figure 13:
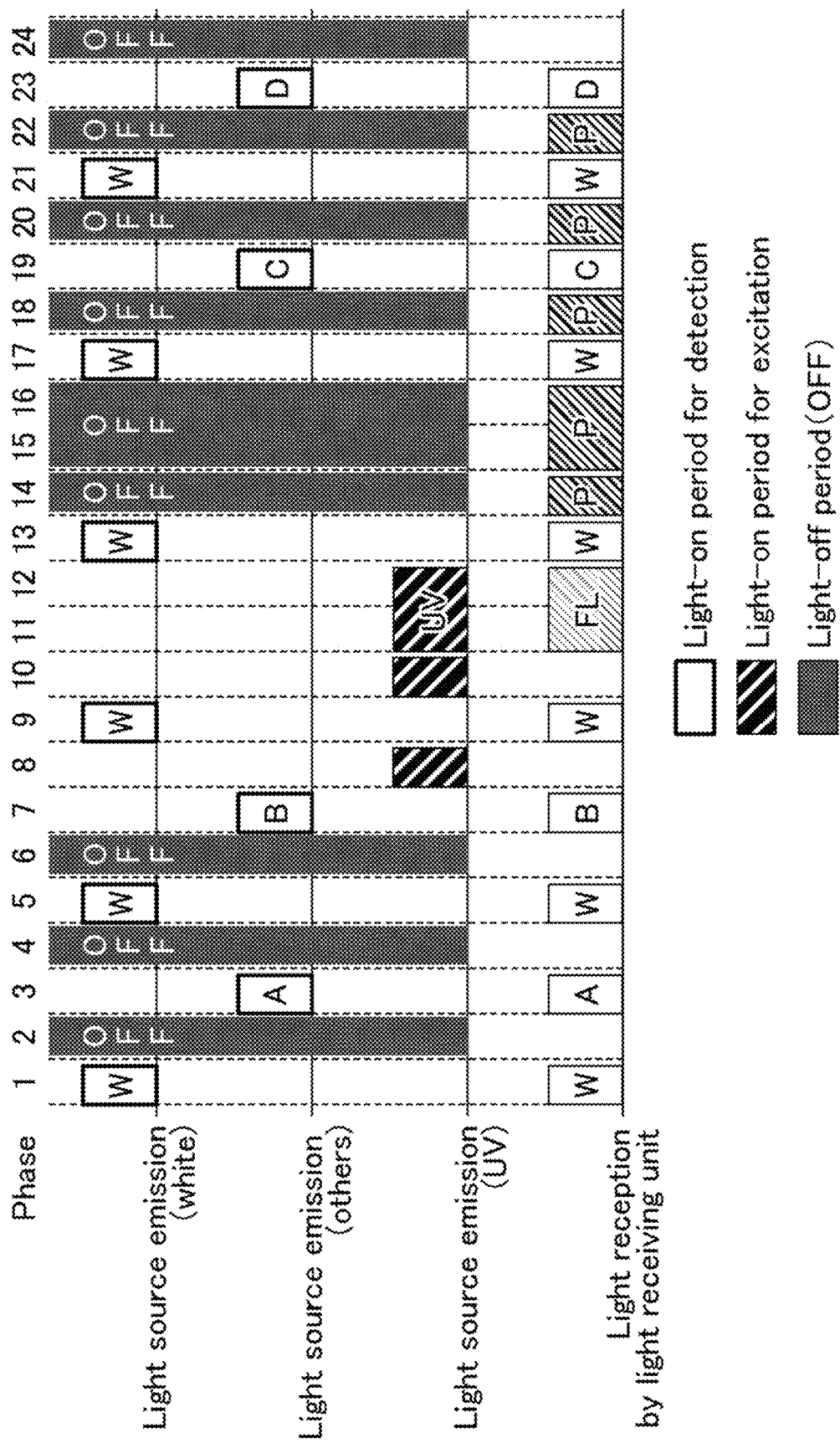
FIG. 13 is a timing chart showing the timing of turning on of a light source and the timing of light reception by a light receiving unit in the banknote handling device of Embodiment 4.

As shown in FIG. 13, at the imaging position for the upper unit 110 in the present embodiment, the light sources 111 emit white light W and the light receiving unit 113 receives the white light W reflected by a banknote in phase 1 of one cycle. Then, in phase 2, the light sources emit no light and the light receiving unit receives no light. In phase 3, the light sources 111 or the light source 124 emit(s) light A and the light receiving unit 113 receives the light A reflected by or transmitted through the banknote. In phase 4, the light sources 111 emit no light and the light receiving unit receives no light. In phase 5, the light sources 111 emit white light W and the light receiving unit 113 receives the white light W reflected by the banknote. In phase 6, the light sources emit no light and the light receiving unit receives no light. In phase 7, the light sources 111 or the light source 124 emit(s) light B and the light receiving unit 113 receives the light B reflected by or transmitted through the banknote. In phase 8, the light sources 111 emit ultraviolet light UV. In phase 9, the light sources 111 emit white light W and the light receiving unit 113 receives the white light W reflected by the banknote. In phase 10, the light sources 111 emit ultraviolet light UV. In phase 11 to phase 12, the light sources 111 emit ultraviolet light UV and the light receiving unit 113 receives fluorescence (FL) from the banknote. In phase 13, the light sources 111 emit white light W and the light receiving unit 113 receives the white light W reflected by the banknote.

In phase 14, the light sources are turned off and the light receiving unit 113 receives phosphorescence (P) from the banknote. In phase 15 to phase 16, the light receiving unit 113 receives phosphorescence from the banknote. In phase 17, the light sources 111 emit white light W and the light receiving unit 113 receives the white light W reflected by the banknote. In phase 18, the light sources are turned off and the light receiving unit 113 receives phosphorescence from the banknote. In phase 19, the light sources 111 or the light source 124 emit(s) light C and the light receiving unit 113 receives the light C reflected by or transmitted through the banknote. In phase 20, the light sources are turned off and the light receiving unit 113 receives phosphorescence from the banknote. In phase 21, the light sources 111 emit white light W and the light receiving unit 113 receives the white light W reflected by the banknote. In phase 21, the light sources 111 are turned off and the light receiving unit 113 receives phosphorescence from the banknote. In phase 23, the light sources 111 or the light source 124 emit(s) light D and the light receiving unit 113 receives the light D reflected by or transmitted through the banknote. In phase 24, the light sources emit no light and the light receiving unit receives no light.

In Embodiment 3, ultraviolet light is emitted in the latter half of phase 2, the latter half of phase 4, the latter half of phase 6, the latter half of phase 8, the latter half of phase 10, and phases 11 to 12. In the present embodiment, ultraviolet light is emitted in phase 8, phase 10, and phases 11 to 12. In both Embodiment 3 and the present embodiment, the light-on periods for excitation are set collectively without phosphorescence detection between the periods, so that ultraviolet light is continuously emitted. In Embodiment 3, in phases 2, 4, 6, and 8, ultraviolet light is emitted for the time half the corresponding phase. In the present embodiment, in phases 8 and 10, ultraviolet light is emitted for the time of the corresponding phase. In other words, in the present embodiment, the time of one ultraviolet light emission is longer than that in Embodiment 3. In this manner, ultraviolet light is emitted continuously in Embodiment 3, while ultraviolet light is emitted continuously and concentratedly in the present embodiment. The continuous and concentrated ultraviolet light emission as in the present embodiment enables application of ultraviolet light to a banknote with a high intensity before the phosphorescence detection.

The light source control unit 11 causes the light sources 111 to emit ultraviolet light UV at least one time (phases 8 and 10) before the light receiving unit 113 receives fluorescence emitted from the banknote BN (before phases 11 to 12) in one cycle.

The light source control unit 11 also keeps the light sources 111 turned off in the light-off periods (phases 14, 15 to 16, 18, 20, 22, and 24) after the emission of ultraviolet light UV in the light-on periods for excitation (phases 8, 10, and 11 to 12). The light receiving unit 113 receives fluorescence emitted from the banknote BN in any of the second and subsequent periods (here, phases 11 to 12) of the light-on periods for excitation (phases 8, 10, and 11 to 12) in which the light sources 111 emit ultraviolet light UV, and receives phosphorescence emitted after the lapse of the light-on periods for excitation (phases 8, 10, and 11 to 12) from the banknote BN in each of the light-off period (phases 14, 15 to 16, 18, 20, and 22).

Embodiment 5

In the present embodiment, the features unique to the present embodiment are mainly described, and the same features as in the embodiments above are not described in detail below. A banknote handling device of the present embodiment has the same structure as that of Embodiment 3 except that the details of turning on of each light source and light reception and the timings thereof are as shown in FIG. 14.

Figure 14:
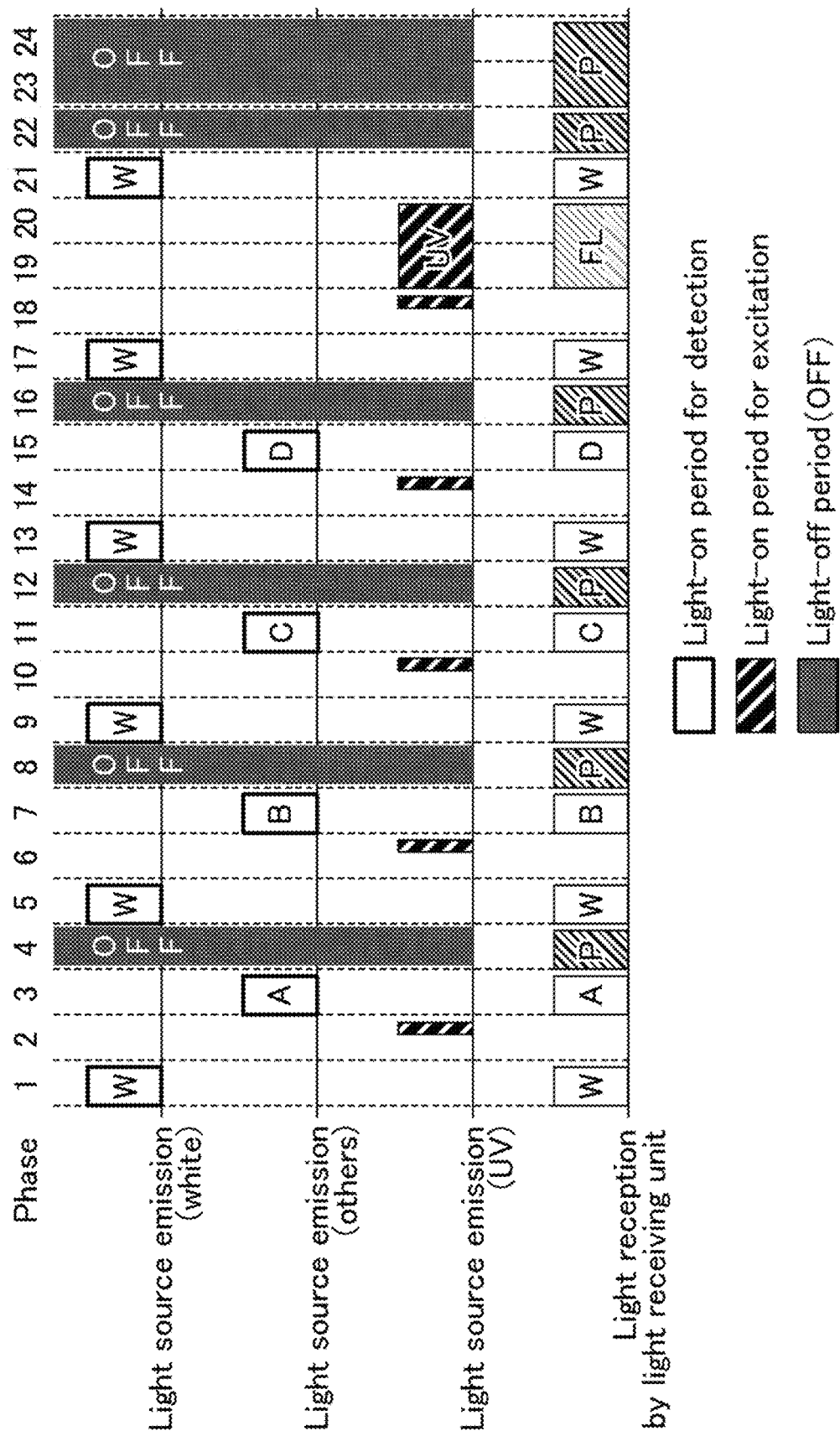
FIG. 14 is a timing chart showing the timing of turning on of a light source and the timing of light reception by a light receiving unit in a banknote handling device of Embodiment 5.

As shown in FIG. 14, at the imaging position for the upper unit 110 in the present embodiment, the light sources 111 emit white light W and the light receiving unit 113 receives the white light W reflected by a banknote in phase 1 of one cycle. Then, in the latter half of phase 2, the light sources 111 emit ultraviolet light UV. In phase 3, the light sources 111 or the light source 124 emit(s) light A and the light receiving unit 113 receives the light A reflected by or transmitted through the banknote. In phase 4, the light sources are turned off and the light receiving unit 113 receives phosphorescence (P) from the banknote. In phase 5, the light sources 111 emit white light W and the light receiving unit 113 receives the white light W reflected by the banknote. In the latter half of phase 6, the light sources 111 emit ultraviolet light UV. In phase 7, the light sources 111 or the light source 124 emit(s) light B and the light receiving unit 113 receives the light B reflected by or transmitted through the banknote. In phase 8, the light sources are turned off and the light receiving unit 113 receives phosphorescence from the banknote. In phase 9, the light sources 111 emit white light W and the light receiving unit 113 receives the white light W reflected by the banknote. In the latter half of phase 10, the light sources 111 emit ultraviolet light UV. In phase 11, the light sources 111 or the light source 124 emit(s) light C and the light receiving unit 113 receives the light C reflected by or transmitted through the banknote. In phase 12, the light sources are turned off and the light receiving unit 113 receives phosphorescence from the banknote. In phase 13, the light sources 111 emit white light W and the light receiving unit 113 receives the white light W reflected by the banknote. In the latter half of phase 14, the light sources 111 emit ultraviolet light UV. In phase 15, the light sources 111 or the light source 124 emit(s) light D and the light receiving unit 113 receives the light D reflected by or transmitted through the banknote. In phase 16, the light sources are turned off and the light receiving unit 113 receives phosphorescence from the banknote.

In phase 17, the light sources 111 emit white light W and the light receiving unit 113 receives the white light W reflected by the banknote. In the latter half of phase 18, the light sources 111 emit ultraviolet light UV. In phases 19 to 20, the light sources 111 emit ultraviolet light UV and the light receiving unit 113 receives fluorescence (FL) from the banknote. In phase 21, the light sources 111 emit white light W and the light receiving unit 113 receives the white light W reflected by the banknote. In phase 22, the light sources 111 are turned off and the light receiving unit 113 receives phosphorescence from the banknote. In phases 23 to 24, the light sources are turned off and the light receiving unit 113 receives phosphorescence from the banknote.

In Embodiments 3 and 4, UV is continuously emitted, and then phosphorescence is continuously detected, i.e., ultraviolet light is not emitted after phosphorescence detection. In the present embodiment, ultraviolet emission and phosphorescence detection are alternately repeated in the manner of ultraviolet light emission, phosphorescence detection, ultraviolet light emission, phosphorescence detection, and so forth. A period may be scheduled in which ultraviolet light emission and phosphorescence detection are alternately repeated as in Embodiment 5. This mode enables phosphorescence detection in a stage where the attenuation of phosphorescence is small.

The light source control unit 11 causes the light sources 111 to emit ultraviolet light UV at least one time (phases 2, 6, 10, 14, and 18) before the light receiving unit 113 receives fluorescence emitted from the banknote BN (before phases 19 to 20) in one cycle.

The light source control unit 11 emits excitation light to increase the intensity of phosphorescence (each of phases 2, 6, 10, 14, and 18 in each of which fluorescence is not received) at least one time (here, five times) for a time shorter than the ultraviolet light UV emission time for fluorescence detection (the ultraviolet light UV emission time in phases 19 to 20).

The light receiving unit 113 receives phosphorescence emitted from the banknote BN in at least one period (here, phases 4, 8, 12, and 16) of the light-off periods (phases 4, 8, 12, and 16) before receiving fluorescence emitted from the banknote BN (before phases 19 to 20) in one cycle.

Embodiment 6

In the present embodiment, the features unique to the present embodiment are mainly described, and the same features as in the embodiments above are not described in detail below. A banknote handling device of the present embodiment has the same structure as that of Embodiment 3 except that the details of turning on of each light source and light reception related and the timings thereof are as shown in FIG. 15.

Figure 15:
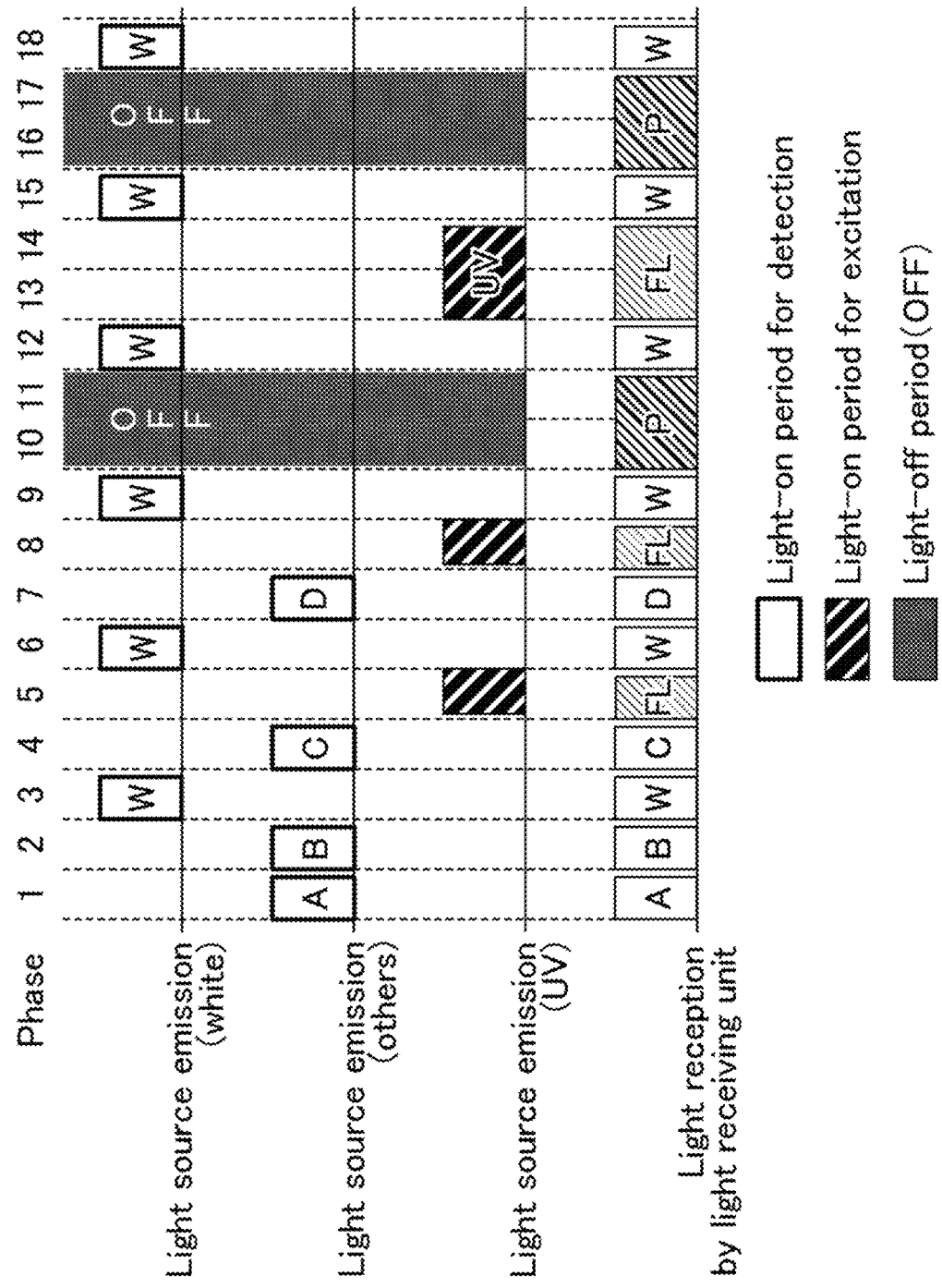
FIG. 15 is a timing chart showing the timing of turning on of a light source and the timing of light reception by a light receiving unit in a banknote handling device of Embodiment 6.

As shown in FIG. 15, at the imaging position for the upper unit 110 in the present embodiment, the light sources 111 or the light source 124 emit(s) light A and the light receiving unit 113 receives the light A reflected by or transmitted through a banknote in phase 1 of one cycle. In phase 2, the light sources 111 or the light source 124 emit(s) light B and the light receiving unit 113 receives the light B reflected by or transmitted through the banknote. In phase 3, the light sources 111 emit white light W and the light receiving unit 113 receives the white light W reflected by the banknote. In phase 4, the light sources 111 or the light source 124 emit(s) light C and the light receiving unit 113 receives the light C reflected by or transmitted through the banknote. In phase 5, the light sources 111 emit ultraviolet light UV and the light receiving unit 113 receives fluorescence (FL) from the banknote. In phase 6, the light sources 111 emit white light W and the light receiving unit 113 receives the white light W reflected by the banknote. In phase 7, the light sources 111 or the light source 124 emit(s) light D and the light receiving unit 113 receives the light D reflected by or transmitted through the banknote. In phase 8, the light sources 111 emit ultraviolet light UV and the light receiving unit 113 receives fluorescence from the banknote. In phase 9, the light sources 111 emit white light W and the light receiving unit 113 receives the white light W reflected by the banknote.

In phases 10 and 11, the light sources are turned off and the light receiving unit 113 receives phosphorescence (P) from the banknote. In phase 12, the light sources 111 emit white light W and the light receiving unit 113 receives the white light W reflected by the banknote. In phases 13 to 14, the light sources 111 emit ultraviolet light UV and the light receiving unit 113 receives fluorescence from the banknote. In phase 15, the light sources 111 emit white light W and the light receiving unit 113 receives the white light W reflected by the banknote. In phases 16 to 17, the light sources are turned off and the light receiving unit 113 receives phosphorescence from the banknote. In phase 18, the light sources 111 emit white light W and the light receiving unit 113 receives the white light W reflected by the banknote.

In Embodiments 3 to 5, the phases in which white light W is emitted and received (hereinafter, also referred to as white light phases) are periodically scheduled, while the phases in which other lights (A to D) are emitted and received (hereinafter, also referred to as the other phases) are distributed between white light phases. In other words, only one of the other phases is scheduled for between consecutive white light phases. Meanwhile, in the present embodiment, two or more of the other phases are scheduled for between consecutive white light phases. As described above, the other phases may be scheduled as desired as long as the periodicity of the white light phases is not disrupted.

The light receiving unit 113 receives phosphorescence emitted from the banknote BN in at least one period (here, phases 10 to 11) of the light-off periods (phases 10 to 11 and 16 to 17) before receiving fluorescence emitted from the banknote BN (before phases 13 to 14) in one cycle.

Embodiment 7

In the present embodiment, the features unique to the present embodiment are mainly described, and the same features as in the embodiments above are not described in detail below. A banknote handling device of the present embodiment has the same structure as that of Embodiment 5 except for the structures of the light receiving units 113 and 123. The present embodiment describes the light receiving unit 113. The light receiving unit 123 has the same structure as the light receiving unit 113. The present embodiment features a function of invalidating (not validating) a signal of light incident on the light receiving unit 113.

Figure 16:
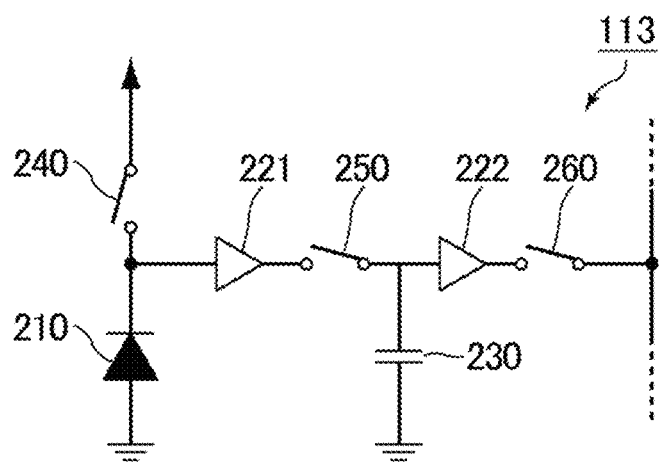
FIG. 16 is a circuit diagram showing a light receiving unit in a banknote handling device of Embodiment 7.

The details of turning on of each light source and light reception and the timings thereof in the banknote handling device of the present embodiment are shown in FIG. 14 as in Embodiment 5. The light receiving unit 113 in the banknote handling device of the present embodiment includes, as shown in FIG. 16, a photodiode 210 as a light receiving element, amplifiers 221 and 222, a capacitor 230, a reset switch 240, a hold switch 250, and a reed switch 260. The photodiode 210 and the capacitor 230 are connected to each other via the amplifier 221 and the hold switch 250 sequentially from the photodiode 210 side. A line diverged from the line connecting the photodiode 210 and the amplifier 221 is connected to the reset switch 240. The capacitor 230 is connected to the reed switch 260 via the amplifier 222. The electric charge generated in the photodiode 210 is stored in the capacitor 230 when the hold switch 250 is in the on state and the reset switch 240 and the reed switch 260 are in the off state. The electric charge stored in the capacitor 230 is transferred to the sensor control unit 12 when the reed switch 260 is in the on state and the reset switch 240 and the hold switch 250 are in the off state. The capacitor 230 is discharged when the reset switch 240 and the hold switch 250 are in the on state and the reed switch 260 is in the off state.

Figure 17:
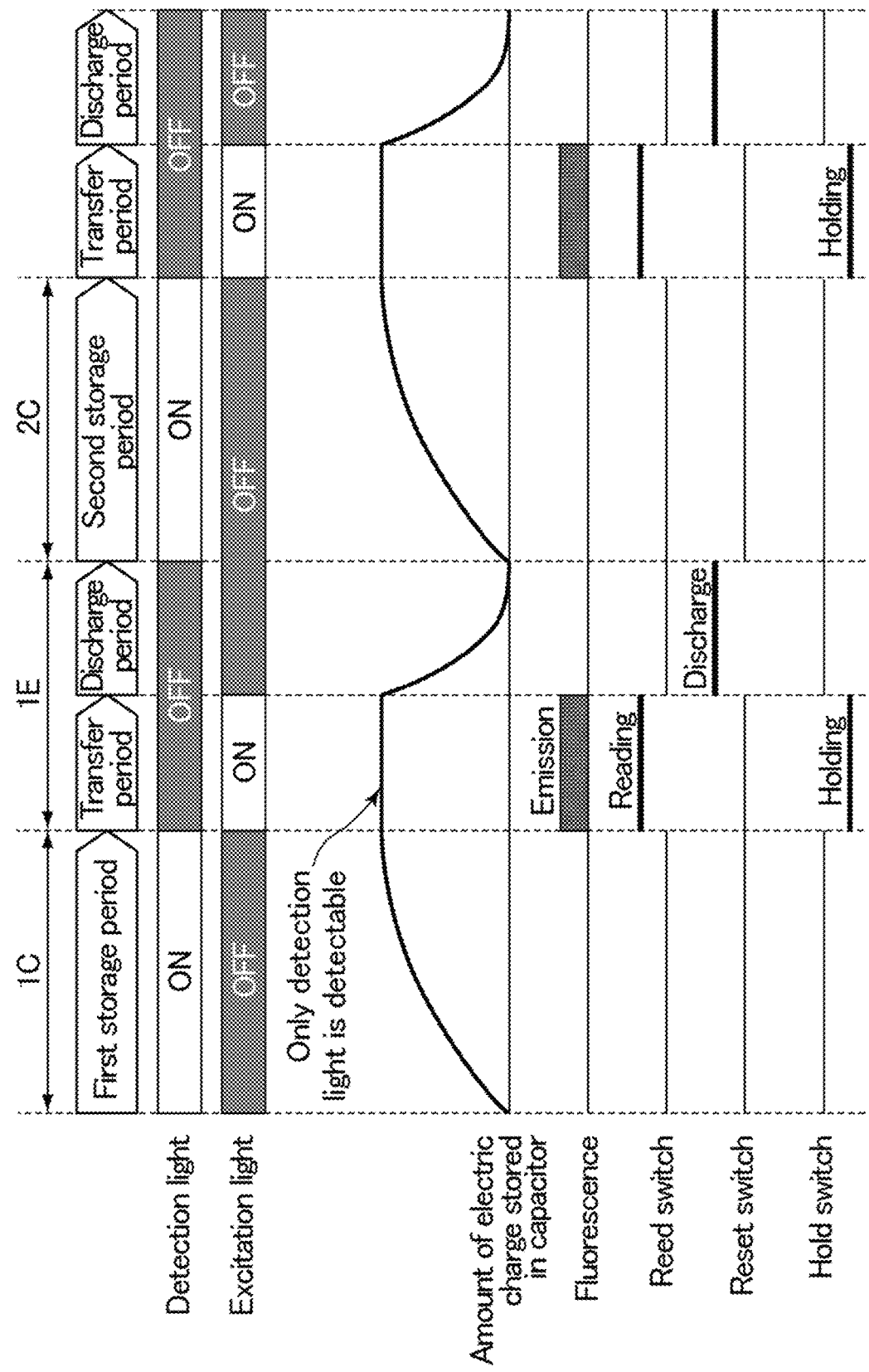
FIG. 17 is a timing chart showing the timing of turning on of a light source, the connection state of each switch of a light receiving unit, and the amount of electric charge stored in the banknote handling device of Embodiment 7.

As shown in FIG. 17, in the first storage period 1C, detection light is emitted and excitation light is turned off. At this time, the reset switch 240 and the reed switch 260 are in the off state while the hold switch 250 is in the on state. In the first storage period 1C, detection light is emitted, and the electric charge generated in the photodiode 210 in an amount corresponding to the amount of incident light from a banknote based on the detection light is amplified by the amplifier 221 and then stored in the capacitor 230.

In the period 1E between the first storage period 1C and the second storage period 2C, the detection light is turned off and the electric charge based on the detection light stored in the first storage period 1C is transferred, converted by A/D conversion, and released. The period 1E sequentially includes a transfer period and a discharge period. In the transfer period, excitation light is also emitted when the electric charge stored in the capacitor 230 is transferred. In the discharge period, the electric charge stored in the capacitor 230 is released. The A/D conversion is executed at an appropriate timing in the period 1E.

Figure 18:
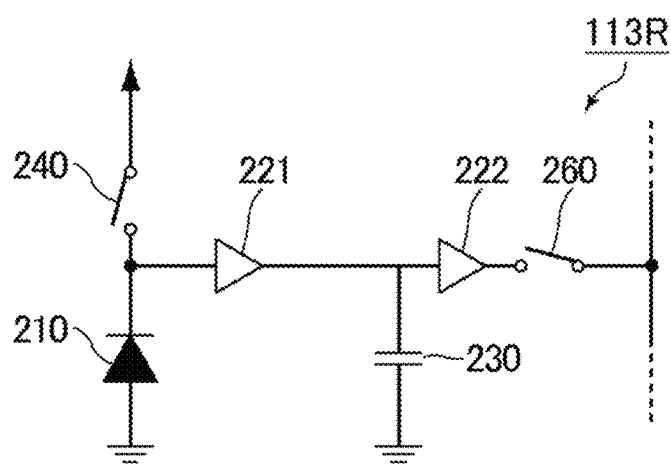
FIG. 18 is a circuit diagram showing a light receiving unit in a banknote handling device of Comparative Embodiment 2.
Figure 19:
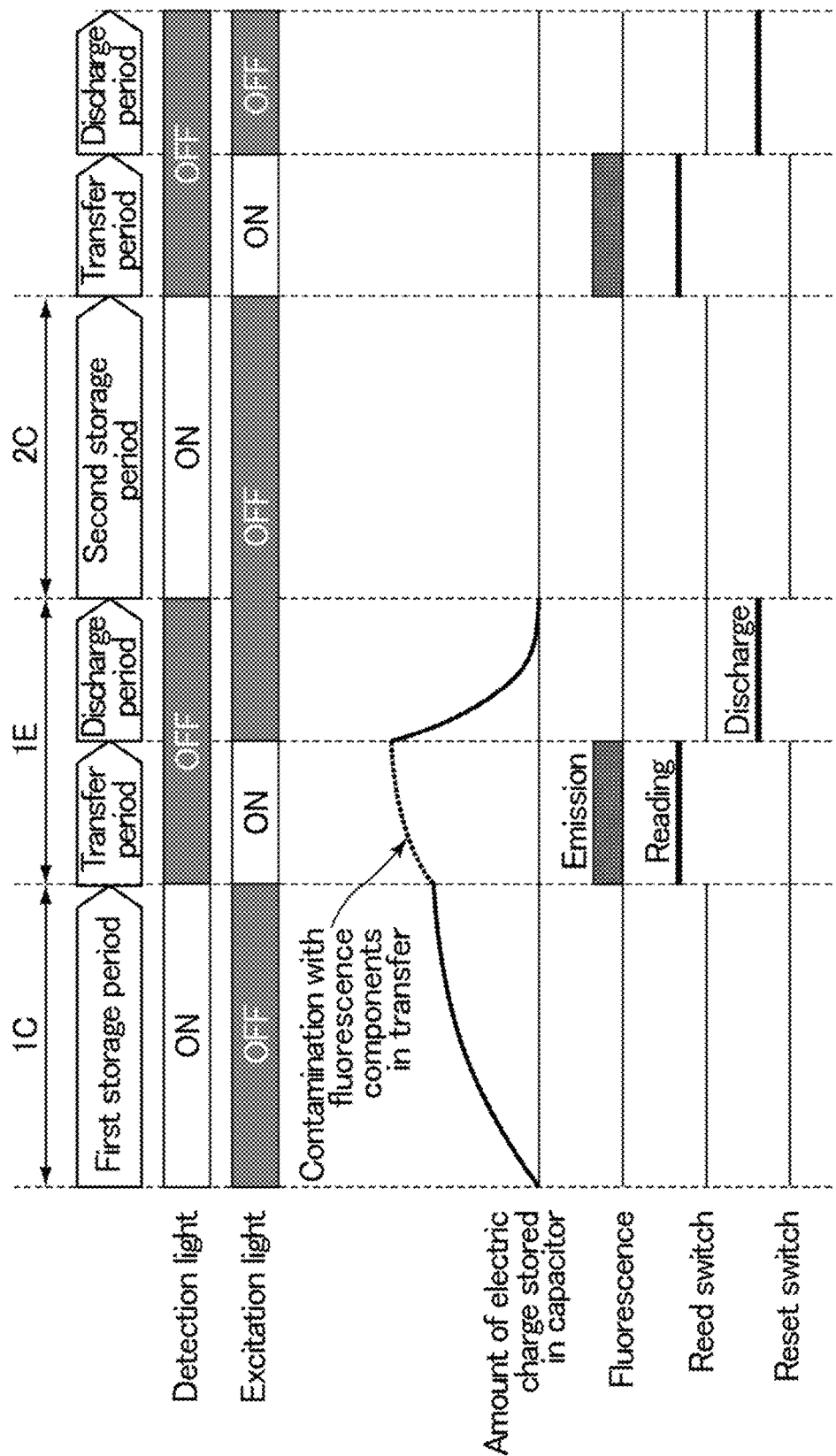
FIG. 19 is a timing chart showing the timing of turning on of a light source, the connection state of each switch of a light receiving unit, and the amount of electric charge stored in the banknote handling device of Comparative Embodiment 2.

The features of the present embodiment in the transfer period are described in comparison with a banknote handling device of Comparative Embodiment 2. The banknote handling device of Comparative Embodiment 2 is described with reference to FIG. 18 and FIG. 19. As shown in FIG. 18, the banknote handling device of Comparative Embodiment 2 has the same structure as the banknote handling device of Embodiment 7 except that a light receiving unit 113R does not include the hold switch 250. In the light receiving unit 113R in the banknote handling device of Comparative Embodiment 2, the photodiode 210 and the capacitor 230 are kept connected via the amplifier 221. When the reed switch 260 is in the on state and the reset switch 240 is in the off state and excitation light is emitted in the transfer period, as shown in FIG. 19, the electric charge resulting from the fluorescence components emitted from the banknote under the excitation light is mixed into the electric charge stored in the capacitor 230 in the transfer period. In this case, the electric charge stored in the first storage period 1C cannot be accurately transferred. Meanwhile, in the present embodiment, the hold switch 250 capable of switching the state of connection between the photodiode 210 and the capacitor 230 is provided between them. Thus, when the reed switch 260 is in the on state and the reset switch 240 is in the off state and excitation light is emitted in the transfer period, the hold switch 250 can be turned into the off state. This terminates the connection between the photodiode 210 and the capacitor 230, prevents contamination with the electric charge resulting from the fluorescence components emitted from the banknote under the excitation light in the transfer period, enables accurate detection of the amount of electric charge resulting from the detection light emitted in the first storage period 1C, and enables an increase in intensity of phosphorescence.

In the discharge period in the present embodiment, the detection light and the excitation light are turned off, the reed switch 260 is in the off state, and the reset switch 240 and the hold switch 250 are in the on state. This releases the electric charge stored in the capacitor 230. In this manner, the electric charge is transferred, subjected to the A/D conversion, and released (reset), followed by the start of the second storage period 2C. In one cycle, the storage, transfer, A/D conversion, and resetting of electric charge are repeated.

One cycle includes, at least one time, the combination of the first storage period 1C, the transfer period, the discharge period, and the second storage period 2C, which can be appropriately scheduled for any time suitable for the timing of excitation light emission.

In the present embodiment, excitation light may be emitted in the discharge period as well as in the transfer period in order to increase the intensity of phosphorescence. In other words, the excitation light emission for an increase in the intensity of phosphorescence may be executed in the transfer period and the discharge period, or may overlap the transfer period and the discharge period. In addition, the excitation light for an increase in the intensity of phosphorescence may be emitted in the discharge period, not in the transfer period. In the discharge period, the electric charge generated in the photodiode 210 is released without being stored in the capacitor 230. Thus, the excitation light emission in the discharge period also can prevent storage in the capacitor 230 of the electric charge resulting from the fluorescence components emitted from the banknote under the excitation light. In other words, the intensity of phosphorescence can be increased while contamination with unnecessary electric charge is prevented.

Embodiment 8

In the present embodiment, the features unique to the present embodiment are mainly described, and the same features as in the embodiments above are not described in detail below. A banknote handling device of the present embodiment has the same structure as that of Embodiment 3 except that the details of turning on of each light source and light reception and the timings thereof are as shown in FIG. 21.

First, the present embodiment is summarized. In fluorescence detection using the imaging unit 21, ultraviolet light (UV) as excitation light is applied to a banknote to acquire a fluorescent image of the banknote. The authenticity of the banknote is determined based on the fluorescent image. Then, two types of ultraviolet lights, namely ultraviolet light with a relatively high dose (e.g., ultraviolet light with a high emission intensity) and ultraviolet light with a relatively low dose (e.g., ultraviolet light with a low emission intensity), as excitation lights are applied to the banknote to acquire fluorescent images. Image(s) whose brightness is not saturated of the two acquired fluorescent images is/are used to determine the authenticity of the banknote. This enables selection of an appropriate fluorescent image(s) for the emission intensity of the fluorescence ink, enabling more accurate authenticity determination.

FIG. 21 is a timing chart showing sensor control (turning on of light sources) for fluorescence and phosphorescence detection in a banknote handling device (imaging unit) of Embodiment 8 and a series of signal detection timings. In FIG. 21, W indicates a light-on period for detection of white light and reception of white light, and X indicates a light-on period for detection of any of first infrared light (IR1), second infrared light (IR2), third infrared light (IR3), infrared light transmitted through a banknote (TIR), and green light transmitted through a banknote (TG). Also in FIG. 21, UV indicates a light-on period for excitation in which ultraviolet light as excitation light is turned on and fluorescence detection, and PH indicates a light-off period and phosphorescence detection. Here, control of fluorescence and phosphorescence detection is performed in two cycles to suit for a phosphorescent ink having a long time constant. Yet, control may be implemented to detect fluorescence and phosphorescence in one cycle or control may be implemented to detect fluorescence and phosphorescence in three or more cycles.

As shown in FIG. 21, at the imaging position for the upper unit 110 in the present embodiment, turning on of white light W and detection light X and reception thereof are periodically repeated. At certain points during the repetition are executed the following processes: (1) ultraviolet light UV is emitted at the first dose (high dose) in one or more phases to cause a phosphorescent ink to absorb the ultraviolet light; (2) ultraviolet light UV is emitted at the first dose (high dose) in one phase for a low intensity fluorescent ink; (3) the light sources are turned off during the light-off period in one or more phases starting from one immediately after turning off of ultraviolet light UV, so that the light receiver 113 receives phosphorescence from the banknote; (4) ultraviolet light UV is emitted at the second dose (low dose) lower than the first dose in one phase for a high intensity fluorescent ink, and the light receiver 113 receives fluorescence from the banknote; and (5) the light sources are turned off during the light-off period in one or more phases, so that the light receiver 113 receives phosphorescence from the banknote. In this order, the series of ultraviolet light emission and fluorescence and phosphorescence detection processes are executed.

The term "low intensity fluorescent ink" means a fluorescent ink that emits fluorescence at a low emission intensity. The term "high intensity fluorescent ink" means a fluorescent ink that emits fluorescence at a high emission intensity. The ultraviolet light irradiation in (4) above, the dose is lowered by reducing the irradiation time and/or the amount of current supplied to the light sources as compared with ultraviolet light irradiation in (1) and (2) above. In the case of reducing the irradiation time, the time for the light receiver 113 to receive fluorescence in (4) above is set short as with the irradiation time. In the case of adjusting the dose only by reducing the amount of current supplied to the light sources, the time for the light receiver 113 to receive fluorescence may be constant.

The fluorescent images of two fluorescence levels are then acquired through the high and low ultraviolet light irradiation in (2) and (4) above. Image(s) whose brightness is not saturated of the two fluorescent images is/are used to determine the authenticity of the banknote.

In addition, phosphorescence signals of the plurality of phases in (3) above are used to determine the time constant of the phosphorescent ink. Furthermore, the output values based on the phosphorescence signals detected in (3) and (5) above are summed up. The existence of phosphorescence is determined based on the sum.

The present embodiment enables acquisition of fluorescent images including no signal saturation even with a high intensity fluorescent ink. There are various fluorescent inks for banknotes from those with a low emission intensity to those with a high emission intensity, and thus it is difficult to successfully detect fluorescence from all types of fluorescent inks by only one phase of fluorescence detection. Yet, the present embodiment includes ultraviolet light irradiation at two levels, i.e., high/low levels, and can therefore detect fluorescence from fluorescent inks with a wide range of emission intensities.

The present embodiment also can detect the feature of phosphorescence decay of a phosphorescent ink having a short time constant. The feature of phosphorescence decay of a phosphorescent ink having a short time constant appears in the phosphorescence signal of the phase immediately after turning off of the ultraviolet light, i.e., the first phase in (3) above. Since the present embodiment requires no reduction in dose of ultraviolet light in (2) above, the phosphorescence signal of the first phase in (3) above is useful.

With use of two fluorescent images with no saturation in (2) and (4) above, when fluorescent inks with high/low intensities are printed on one medium, for example, each fluorescent ink can be evaluated with a high S/N. Also with use of two unsaturated fluorescent images, when a mixed ink of a fluorescent ink and a phosphorescent ink is printed on one medium, the length of the time constant of the phosphorescent ink is reflected on the brightness of the fluorescent images. This raises a possibility that the signal ratio of the two fluorescent images can be used as one of the feature amounts used to determine the time constant of the phosphorescent ink.

In the present embodiment, the existence of fluorescence may be determined based on the existence of a saturated fluorescence signal (saturated fluorescent image).

Also, a phase in which fluorescence is detected may be added to schedule three or more phases. The dose of ultraviolet light irradiation in the added phase may differ from the first and second doses in (2) and (4) above.

The irradiation level (dose) of ultraviolet light in (2) above is set the same as the irradiation level (dose) of ultraviolet light in (1) above, but they may be different from each other. For example, the dose of ultraviolet light in (2) above may be lower than (e.g., 80% to 90% of) the dose of ultraviolet light in (1) above.

When the irradiation levels (doses) of ultraviolet light in (1) and (2) are the same, fluorescence may be detected in any phase in (1) and (2) above.

Modified Example 1

In Embodiments 3 to 7, the arithmetic logic unit 16 sums up the output values based on the respective phosphorescence components received by the light receiving unit 113 or 123 in the light-off periods in one cycle, and the light source control unit 11 emits excitation light in the light-on periods for excitation in one cycle. However, only one of the summing up of the output values based on the respective phosphorescence components and the excitation light emission in the light-on periods for excitation may be executed. For example, only one light-on period for excitation may be scheduled, and the arithmetic logic unit 16 may calculate the output value of one cycle by summing up the output values based on the respective phosphorescence components received by the light receiving unit 113 or 123 in the light-off periods in one cycle. Also, a plurality of light-on periods for excitation may be scheduled and the output value based on one phosphorescence component received by the light receiving unit 113 or 123 in one light-off period in one cycle may be used as the output value of one cycle.

Modified Example 2

In Embodiments 1 to 8, when the excitation light is emitted, the other lights are not emitted. Yet, excitation light may be emitted simultaneously with light for detection of any other characteristic amount, as long as the reflection light, fluorescence, and phosphorescence resulting from the excitation light do not affect detection of the characteristic amount.

Modified Example 3

Although the schedule and the times of phases for the excitation light emission and phosphorescence reception are specifically described in Embodiments 3 to 8, the schedule and the times of ultraviolet light emission and phosphorescence reception may appropriately be changed as long as the change does not affect the results of banknote recognition (authenticity, stain/soiling) based on detection of any other characteristic amount(s).

Modified Example 4

Although the output values are summed up in phosphorescence detection in Embodiments 1 to 8, the output values obtained in a plurality of phases may be summed up and the sum may be used as the output value of one cycle in fluorescence detection or the other characteristic amount detection. Specifically, in the optical sensor of the present modified example, a light source control unit may cause a light source to emit at least one type of light in a plurality of light-on periods in one cycle, a light receiving unit may receive light from the banknote resulting from the same type of light applied to the same side of the banknote in each of a plurality of periods (which may be a plurality of light-on periods) in one cycle, and an arithmetic logic unit may generate data of one pixel by summing up the output values based on the respective light components received by the light receiving unit in the periods in one cycle. This mode can increase the S/N of image signals based on the light components from the banknote as in the case of summing up the output values based on the phosphorescence components. The mode also can reduce the amount of current required for the light sources. The mode also can reduce or prevent an increase in time required for one cycle.

The same type of light applied to the same side of a banknote is light having the same wavelength band applied to the surface A or B of the banknote. The light from the banknote resulting from the same type of light applied to the same side of the banknote is, for example, light resulting from reflection by the banknote of light having a certain wavelength band applied to the surface A of the banknote, light resulting from reflection by the banknote of light having a certain wavelength band applied to the surface B of the banknote, and light resulting from transmission through the banknote of light having a certain wavelength band applied to the surface B of the banknote.

Modified Example 5

In Embodiments 3 to 8, white light is emitted and blue light, green light, and red light are simultaneously received respectively by three types of light receiving elements, namely a blue light receiving element 133B, a green light receiving element 133G, and a red light receiving element 133R. In Embodiments 1 to 8, blue light, green light, and red light may be alternately emitted and light from a banknote may be received by one type of light receiving element.

Modified Example 6

In Embodiments 1 to 8, a banknote is irradiated with ultraviolet light as excitation light, and fluorescence and phosphorescence each having a wavelength in the visible light range are received. Yet, a banknote may be irradiated with light other than ultraviolet light as excitation light (e.g., visible light or infrared light) and fluorescence and phosphorescence each having a wavelength band in the range other than the visible light range (e.g., infrared light range) may be received.

Modified Example 7

In Embodiments 1, 3 to 7, the output values based on the phosphorescence components received in the light-off periods in one cycle are summed up. Yet, the phosphorescence components related to the output values to be summed up may be those received over two or more cycles. Here, the two or more cycles may be consecutive cycles (e.g., two consecutive cycles). The number of times of phosphorescence component reception in each of the cycles can be set as appropriate, and may be one or two or more.

As descried above, the embodiments were described with reference to the drawings. The present disclosure is not limited to these embodiments. The structures of the embodiments may be combined or modified as appropriate within the spirit of the present disclosure.

INDUSTRIAL APPLICABILITY

As described above, the present invention provides a technique useful in detecting light from a transported sheet.

What is claimed is:

1. An optical sensor that detects light reflected by a transported sheet and/or light transmitted through the sheet as well as light emitted from the sheet,
the optical sensor comprising:
a light source configured to irradiate a sheet with excitation light and detection light;
a controller configured to cause the light source to emit the detection light in a plurality of light-on periods and the excitation light at least one time, and keep the light source turned off during each of a plurality of light-off periods after the emission of the excitation light; and
a light receiver configured to receive light resulting from reflection of the detection light by a sheet and/or light resulting from transmission of the detection light through the sheet in each of the plurality of light-on periods and receive phosphorescence emitted from the sheet in each of the plurality of light-off periods,
the controller configured to generate data of one pixel by summing up a plurality of output values based on a plurality of respective phosphorescence components received by the light receiver in each of the plurality of light-off periods.

2. The optical sensor according to claim 1,
wherein the controller is configured to, in one cycle, cause the light source to emit the detection light in the plurality of light-on periods and the excitation light at least one time, and keep the light source turned off during each of the plurality of light-off periods after the emission of the excitation light;
the light receiver is configured to, in one cycle, receive the detection light reflected by a sheet and/or the detection light transmitted through the sheet in each of the plurality of light-on periods and receive phosphorescence emitted from the sheet in each of the plurality of light-off periods; and
the controller is configured to generate data of one pixel by summing up a plurality of output values based on a plurality of respective phosphorescence components received by the light receiver in each of the plurality of light-off periods in one cycle.

3. The optical sensor according to claim 1,
wherein the controller is configured to cause the light source to emit the excitation light in a plurality of periods each sandwiched between two consecutive light-on periods of the detection light.

4. The optical sensor according to claim 3,
wherein the controller is configured to, in one cycle, cause the light source to emit the excitation light in the plurality of periods.

5. The optical sensor according to claim 3,
wherein the controller is configured to cause the light source to emit the excitation light at a first dose in a first period among the plurality of periods and emit the excitation light at a second dose lower than the first dose in a second period scheduled for after the first period among the plurality of periods, and
the light receiver is configured to receive fluorescence from the sheet while the light source emits the excitation light in the first period and receive fluorescence from the sheet while the light source emits the excitation light in the second period.

6. The optical sensor according to claim 1,
wherein the light receiver is configured to receive fluorescence emitted from the sheet while the light source emits the excitation light.

7. The optical sensor according to claim 6,
wherein the controller is configured to cause the light source to emit the excitation light at least one time before the light receiver receives fluorescence emitted from the sheet.

8. The optical sensor according to claim 7,
wherein the light receiver is configured to receive phosphorescence emitted from the sheet in at least one of the plurality of light-off periods before receiving fluorescence emitted from the sheet.

9. The optical sensor according to claim 3,
wherein the controller is configured to keep the light source turned off during each of the plurality of light-off periods after the emission of the excitation light in the plurality of periods, and the light receiver is configured to receive fluorescence emitted from the sheet in any of second and subsequent periods of the plurality of periods in which the light source emits the excitation light and receive phosphorescence emitted after a lapse of the plurality of periods from the sheet in the plurality of light-off periods.

10. The optical sensor according to claim 6,
wherein the light receiver includes a light receiving element, a capacitor configured to store electric charge from the light receiving element, and a hold switch configured to switch electrical connection between the light receiving element and the capacitor,
the light receiver is controlled to sequentially include, in one cycle, a first storage period of storing electric charge from the light receiving element in the capacitor, a transfer period of transferring electric charge stored in the capacitor, a discharge period of discharging the capacitor, and a second storage period of storing electric charge from the light receiving element, and
the light source irradiates a sheet with the excitation light during the transfer period and/or the discharge period, and the hold switch is in an off state during the transfer period so that the electrical connection between the light receiving element and the capacitor is terminated.

11. A sheet recognition unit comprising the optical sensor according to claim 1.

12. A sheet handling device comprising the sheet recognition unit according to claim 11.

13. An optical sensor that detects light reflected by a transported sheet and/or light transmitted through the sheet as well as light emitted from the sheet,
the optical sensor comprising:
a light source configured to irradiate a sheet with excitation light and detection light;
a controller configured to cause the light source to emit the detection light in a plurality of light-on periods and the excitation light in a plurality of periods each sandwiched between two consecutive light-on periods of the detection light, and keep the light source turned off in a light-off period after the emission of the excitation light; and
a light receiver configured to receive light resulting from reflection of the detection light by a sheet and/or light resulting from transmission of the detection light through the sheet in each of the light-on periods and receive phosphorescence emitted from the sheet in the light-off period.

14. The optical sensor according to claim 13,
wherein the controller is configured to, in one cycle, cause the light source to emit the detection light in the plurality of light-on periods and the excitation light in the plurality of periods each sandwiched between the two consecutive light-on periods of the detection light, and keep the light source turned off during the light-off period after the emission of the excitation light, and
the light receiver is configured to, in one cycle, receive light resulting from reflection of the detection light by the sheet and/or light resulting from transmission of the detection light through the sheet in each of the plurality of light-on periods and receive phosphorescence emitted from the sheet in the light-off period.

15. The optical sensor according to claim 13,
wherein the light receiver is configured to receive fluorescence emitted from the sheet while the light source emits the excitation light.

16. The optical sensor according to claim 15,
wherein the controller is configured to cause the light source to emit the excitation light at least one time before the light receiver receives fluorescence emitted from the sheet.

17. The optical sensor according to claim 13,
wherein the controller is configured to cause the light source to emit the excitation light at a first dose in a first period among the plurality of periods and emit the excitation light at a second dose lower than the first dose in a second period scheduled for after the first period among the plurality of periods, and
the light receiver is configured to receive fluorescence from the sheet while the light source emits the excitation light in the first period and receive fluorescence from the sheet while the light source emits the excitation light in the second period.

18. The optical sensor according to claim 13,
wherein the controller is configured to keep the light source turned off after the emission of the excitation light in the plurality of periods, and
the light receiver is configured to receive fluorescence emitted from the sheet in any of second and subsequent periods of the plurality of periods in which the light source emits the excitation light and receive phosphorescence emitted after a lapse of the plurality of periods from the sheet in the light-off period.

19. The optical sensor according to claim 15,
wherein the light receiver includes a light receiving element, a capacitor configured to store electric charge from the light receiving element, and a hold switch configured to switch electrical connection between the light receiving element and the capacitor,
the light receiver is controlled to sequentially include, in one cycle, a first storage period of storing electric charge from the light receiving element in the capacitor, a transfer period of transferring electric charge stored in the capacitor, a discharge period of discharging the capacitor, and a second storage period of storing electric charge from the light receiving element, and
the light source irradiates a sheet with the excitation light during the transfer period and/or the discharge period, and the hold switch is in an off state during the transfer period so that the electrical connection between the light receiving element and the capacitor is terminated.

20. The optical sensor according to claim 18,
wherein the controller is configured to, in one cycle, cause the light source to emit the at least one type of light in the plurality of light-on periods;
the light receiver is configured to receive light from the sheet resulting from the same type of light applied to the same side of the sheet in each of the plurality of periods in one cycle; and
the controller is configured to generate data of one pixel by summing up a plurality of output values based on a plurality of respective light components received by the light receiver in each of the plurality of periods in one cycle.

21. An optical sensor that detects light from a transported sheet,
the optical sensor comprising:
a light source configured to irradiate a sheet with at least one type of light;
a controller configured to cause the light source to emit the at least one type of light in a plurality of light-on periods; and a light receiver configured to receive light from the sheet resulting from a same type of light applied to a same side of the sheet in each of a plurality of periods, the controller configured to generate data of one pixel by summing up a plurality of output values based on a plurality of respective light components received by the light receiver in each of the plurality of periods.

\* \* \* \* \*